United States Patent [19]

Kiguchi et al.

[11] Patent Number: 5,391,589
[45] Date of Patent: Feb. 21, 1995

[54] CONTACT LENS AND METHOD OF PRODUCING A CONTACT LENS

[75] Inventors: Hiroshi Kiguchi; Taku Aoyama, both of Suwa, Japan

[73] Assignee: Seiko Epson Corporation, Tokyo, Japan

[21] Appl. No.: 992,911

[22] Filed: Dec. 18, 1992

[30] Foreign Application Priority Data

| Dec. 10, 1991 | [JP] | Japan | 3-325998 |
| Jan. 7, 1992 | [JP] | Japan | 4-001043 |
| Mar. 26, 1992 | [JP] | Japan | 4-068335 |
| Apr. 15, 1992 | [JP] | Japan | 4-095525 |
| Apr. 15, 1992 | [JP] | Japan | 4-095527 |

[51] Int. Cl.⁶ .......... B05D 5/06; C08F 259/08; C08F 265/04; C08F 267/06
[52] U.S. Cl. .................. 523/106; 523/107; 523/108; 526/242; 264/1.7; 264/23; 264/1.36; 351/160 H; 351/177; 427/536
[58] Field of Search ............ 264/1.4, 1.7; 351/177, 351/160 H; 523/106, 107, 108; 526/242

[56] References Cited

U.S. PATENT DOCUMENTS

| 4,447,562 | 5/1984 | Iuawi | 523/106 |
| 4,508,884 | 4/1985 | Wittmann et al. | 526/279 |
| 4,743,667 | 5/1988 | Mizutani et al. | 526/279 |
| 4,868,260 | 9/1989 | Kawaguchi | 526/279 |
| 4,968,532 | 11/1990 | Janssen et al. | 427/400 |

FOREIGN PATENT DOCUMENTS

| 1099663 | 4/1981 | Canada . | |
| 2748568 | 5/1979 | Germany | 264/1.4 |
| 62-10616 | 1/1987 | Japan . | |
| 2209512 | 9/1987 | Japan | 351/160 R |
| 1154021 | 6/1989 | Japan | 264/1.4 |
| 3217816 | 9/1991 | Japan | 264/1.4 |
| 3220519 | 9/1991 | Japan | 264/1.4 |
| 3-288817 | 12/1991 | Japan . | |
| 4-67011 | 3/1992 | Japan . | |
| 4-104121 | 4/1992 | Japan . | |
| 4-163519 | 6/1992 | Japan . | |
| 4-178609 | 6/1992 | Japan . | |
| 4-178610 | 6/1992 | Japan . | |
| 4-178611 | 6/1992 | Japan . | |
| 4-178612 | 6/1992 | Japan . | |
| 4-179915 | 6/1992 | Japan . | |
| 4-179916 | 6/1992 | Japan . | |
| 4-179917 | 6/1992 | Japan . | |
| 4-180013 | 6/1992 | Japan . | |
| 4-181207 | 6/1992 | Japan . | |
| 4-181208 | 6/1992 | Japan . | |
| 4-190319 | 7/1992 | Japan . | |
| 4-190320 | 7/1992 | Japan . | |

Primary Examiner—Paul R. Michl
Assistant Examiner—Andrew E. C. Merriam
Attorney, Agent, or Firm—Oliff & Berridge

[57] ABSTRACT

A contact lens is made by graft polymerization of a contact lens surface by introducing a peroxide on a contact lens substrate surface by a discharging treatment producing a radical and by adding an appropriate amount of a reducing agent to the polymerization system and removing dissolved oxygen in the polymerization system by applying ultrasonic waves under reduced pressure.

73 Claims, 1 Drawing Sheet

CONTACT LENS AND METHOD OF PRODUCING A CONTACT LENS

RELATED APPLICATION

This is a continuation-in-part of International Application Nos. PCT/JP92/01203 and PCT/JP92/01204, both filed Sep. 21, 1992.

BACKGROUND OF THE INVENTION

This invention relates to a contact lens and to a method of producing a hard contact lens having permanent surface wettability and good wearability.

To attain better wearability of a contact lens and to decrease a foreign body sensation when the contact lens is put on, it is important to improve compatibility of the lens surface with the cornea. Optimization of the design elements, including size and form of the lens, is of course an important point, but an essential point to obtain a contact lens having good wearability is the chemical affinity of the contact lens surface with the cornea (a living tissue). One example of a surface treatment process for permanently rendering corneaaffinity to a contact lens surface is graft polymerization of a hydrophilic monomer such as acrylamide on the lens surface, thereby improving functions of the lens surface such as wettability (including water retaining capacity) and sliding capacity.

In order to retain wettability for a long time, the inventors developed a method of improving the rubbing resistance of graft polymer chains by cross-linking them with N,N'-methylenebisacrylamide and the like. There are two major steps to carry out the surface graft reaction efficiently. The first step is to generate a radical which becomes a polymerization starting point on the surface of a substrate material. The second step is to remove a polymerization inhibiting factor which hinders graft polymerization reaction (allows growth of the graft chain from the polymerization starting point). Optimal conditions for preparing a contact lens are not achieved when the steps are carried out independently of each other, but optimal conditions are obtained when the steps are combined. Furthermore, surface graft polymerization reaction conditions differ depending on the substrate materials used and this must be taken into consideration. So far, these two steps have not been combined to achieve optimal results. Described below are current techniques which have been employed for grafting hydrophilic monomers on a contact lens substrate surface.

First, a peroxide is formed on a contact lens surface during discharge treatment. Then a radical is generated by chemically decomposing the peroxide. So far, for the decomposition of the peroxide, pyrolysis has been carried out at a high temperature of 60°–90° C.

The second step, removal of a polymerization inhibiting factor, is as follows. Generally, the most important polymerization inhibiting factor in a solution system is oxygen dissolved in the solution. By removing dissolved oxygen, a graft polymerization reaction can be initiated. So far, in order to remove dissolved oxygen sufficiently, a series of steps is repeated several times: a vessel containing the monomer solution is evacuated, and knocked from outside, then an inactive gas, such as nitrogen, replaces air in the vessel, and the vessel is again evacuated. However, the aforementioned process has serious defects as described below.

First, thermal decomposition of peroxide (radical generation) on the lens substrate surface requires a temperature ranging from 60° to 90° C. The softening point of the currently used lens substrates, which mainly contain an acrylic resin, is within this temperature range, and leads to considerable deformation of the lens substrate and deterioration of optical characteristics (change of lens power, change of transmittance in the visible region and the like).

Regarding the second step, the removal of dissolved oxygen (polymerization inhibiting factor) is preferable for initiating the graft chain growth reaction from the polymerization initiating point and involves a series of steps—evacuating the vessel containing the solution, knocking it from the outside, replacing the gas in the vessel with an inactive gas such as nitrogen, and reevacuating it. These steps are repeated several times and are too complicated to be employed in mass production. Controlling the process is difficult and oxygen dissolved in solution cannot be completely removed and trace amounts remain. Accordingly, the varying trace amounts of dissolved oxygen during polymerization provides fluctuation of graft polymerization conditions, non-homogeneity of graft surface conditions and uncomfortable contact lens wearability in the end.

Methacrylate (which does not include silicon or fluorine), a typical material for a contact lens substrate, has been generally used. A siloxanyl methacrylate (which does not include fluorine) type, a fumarate type and a fluorine containing type contact lens substrates are also known for producing a contact lens having high oxygen permeability. For example, a contact lens substrate containing fluoroalkyl methacrylate as described in Japanese patent application Laid-Open Publication No. 62-294201, is known as a material which shows especially high oxygen permeability. The surface of such a contact lens has high oxygen permeability but low wettability with water; thus the lens feels dry and uncomfortable to a wearer when he or she puts on the contact lens.

Moreover, graft polymerization carried out by contacting hydrophilic monomers alone with the lens surface after the lens surface was treated by discharge under normal pressure, i.e., 1 atm., or reduced pressure, i.e., $10^{-1}$ to about $10^{-2}$ Torr results in weak bonding between the graft polymer and the lens substrate. The graft polymer is relatively easily removed by rubbing with a finger and the like, and wettability returns to the level prior to the graft polymerization.

SUMMARY OF THE INVENTION

The present invention is directed to a contact lens and method of making the same wherein hydrophilic monomers are graft polymerized on a surface of a contact lens substrate such that the density of the cross-linkages of the graft polymers are uniform over the surface of the contact lens substrate.

The present invention is also directed to solve the above mentioned problems. That is, regarding the radical generation (first step), the present invention provides a method of producing a contact lens which enables decomposition of a peroxide at a sufficiently lower temperature than the softening point of the contact lens substrate. Regarding removal of dissolved oxygen (second step), the present invention provides a production method having excellent mass-productivity in which removing dissolved oxygen during surface graft polymerization is simplified, and process control is easy; or a production method which does not require a dissolved oxygen removal step and in which surface graft polymerization treatment is carried out simply and with high yields in mass production. Still another purpose of the present invention is to provide a production method in which those first and second steps are, including the substrate, linked at their optimal conditions, taking step conformity of the first step and the second step into consideration.

DESCRIPTION OF PREFERRED EMBODIMENTS

Figure 1:
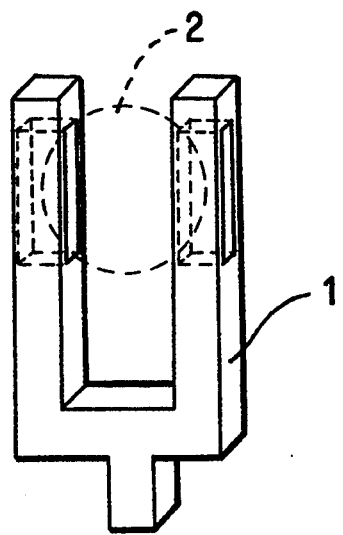
FIG. 1 is a view of a contact lens substrate protection jig of the present invention.

The present invention is directed to a contact lens and method of producing a contact lens comprising (a) carrying out a discharging treatment of a surface of a substrate which is produced from a polymer of an acrylic ester or a methacrylic ester, or a copolymer of an acrylic ester or methacrylic ester and a fumaric ester, as main starting materials, under normal pressure or reduced pressure, (b) immersing the substrate in a hydrophilic monomer solution; (c) adding a cross-linking agent and (d) carrying out graft polymerization of the hydrophilic monomer on the substrate surface under normal or reduced pressure. According to another aspect of the present invention, there is provided a method of producing a contact lens, wherein a reducing substance such as diammonium cerium (IV) nitrate, or ferrous ammonium sulfate (Mohr's salt) is employed with or without a cross-linking agent of step (c) above. According to still another aspect of the present invention, there is provided a method of producing a contact lens, wherein graft polymerization is initiated by heating. According to a further aspect of the present invention, there is provided a method of producing a contact lens, wherein the hydrophilic monomer is acrylamide or N,N'-methylenebisacrylamide. According to a still further aspect of the present invention, there is provided a method of producing a contact lens comprising (a) carrying out discharging treatment under normal or reduced pressure of a surface of a substrate which is produced from a polymer of an acrylic ester or a methacrylic ester, which is a copolymer containing at least one or more compounds selected from methacryloxyalkyl polysiloxane or acryloxyalkyl polysiloxane expressed as the following general formula (the expression (meth)acryloxyalkyl indicates methacryloxyalkyl and acryloxyalky):

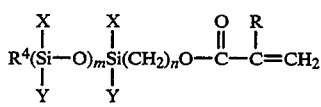

wherein R=CH$_3$ or H; X=(C$_1$-C$_6$) alkyl, cyclohexyl, phenyl or Z$_1$; Y=(C$_1$-C$_6$) alkyl, cyclohexyl, phenyl or Z$_1$;

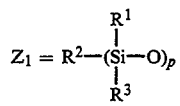

R$^1$=(C$_1$-C$_6$) alkyl, cyclohexyl or phenyl, R$^2$=(C$_1$-C$_6$) alkyl, cyclohexyl or phenyl; R$^3$=(C$_1$-C$_6$) alkyl, cyclohexyl or phenyl; R$^4$=(C$_1$-C$_6$) alkyl, cyclohexyl or phenyl; m=1-3, n=1-5, p=1-3; a fluoroalkyl methacrylate or a fluoroalkyl acrylate having up to 20 fluorine atoms, which is expressed as the following general formula:

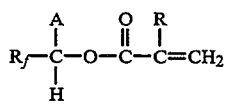

wherein, R=CH$_3$ or H; A=H, cyclohexyl, phenyl or R$_f$;

R$_f$=polyfluoroalkyl or pentafluorophenyl;

a methacryloxyalkyl polyfluoroalkyl siloxane or acryloxyalkyl polyfluoroalkyl siloxane expressed as the following general formula:

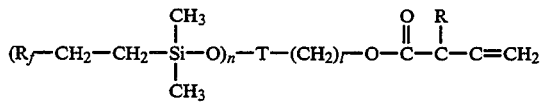

wherein, R=CH$_3$ or H; R$_f$=(C$_1$-C$_4$) fluoroalkyl, 1=1-4; T=SiHCH$_3$, SiH$_2$ or SiHCH$_3$; n=1-3; a methacryloxyalkyl silanol or acryloxy silanol expressed as the following general formula:

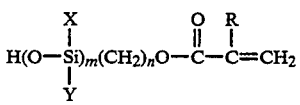

wherein R=CH$_3$ or H; X, Y=(C$_1$-C$_6$) alkyl, phenyl or Z$_1$;

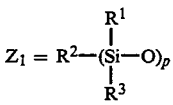

m=1-3; n=1-5; p=1-3; R$^1$=(C$_1$-C$_6$) alkyl, cyclohexyl or phenyl, R$^2$=(C$_1$-C$_6$) alkyl, cyclohexyl or phenyl; R$^3$=(C$_1$-C$_6$) alkyl, cyclohexyl or phenyl; a polymethacryloxyalkyl polysiloxane or polyacryloxyalkyl polysiloxane expressed as the following general formula:

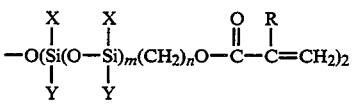

wherein R=CH$_3$ or H; m=0-3; n=1-5, X=(C$_1$-C$_6$) alkyl, cyclohexyl, phenyl or Z; Y=(C$_1$-C$_6$) alkyl, cyclohexyl, phenyl or Z$_1$;

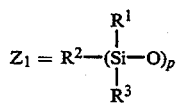

p=1-3; $R^1$=($C_1$-$C_6$) alkyl, cyclohexyl or phenyl, $R^2$=($C_1$-$C_6$) alkyl, cyclohexyl or phenyl; ($C_1$-$C_6$) alkyl, cyclohexyl or phenyl; a fluorine containing siloxanyl methacrylate expressed as the following general formula:

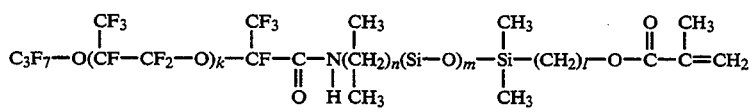

wherein, l=1-3; m=1-10; n=1-3, k=1-3; a fluorine containing acrylic or methacrylic ester type monomer expressed as the following general formula:

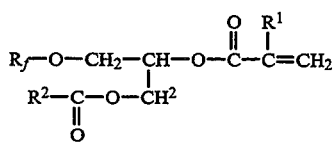

wherein $R_f$=($C_1$-$C_{30}$) fluoroalkyl which contains three or more fluorine atoms and optionally contains one or more oxygen atoms, $R^1$=$CH_3$ or H; $R^2$=($C_1$-$C_{30}$) alkyl, which optionally contains one or more fluorine atoms or one or more oxygen atoms;

a fluorine contained acrylic or methacrylic ester type monomer expressed as the following general formula:

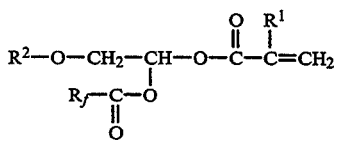

wherein $R_f$=($C_1$-$C_{30}$) fluoroalkyl which contains three or more fluorine atoms and optionally contains one or more oxygen atoms, $R^1$=$CH_3$ or H; $R^2$=($C_1$-$C_{30}$) alkyl, which optionally contains one or more fluorine atoms or one or more oxygen atoms;

a fluorine containing diacrylate or dimethacrylate type monomer expressed as the following general formula:

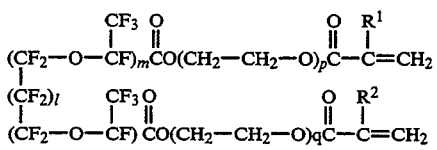

wherein, $R_1$, $R^2$=$CH_3$ or H; l=2-4; p, q=1 or 2; m and n are integral numbers within the range of 1-20; a fluorine containing cyclic olefin expressed as the following general formula:

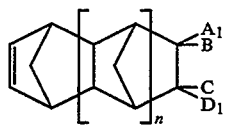

wherein, $A_1$,=H, F or an alkyl; B=H, F or an alkyl; C=H, F or an alkyl ($C_1$ to $C_{30}$); and $D_1$,=F or ($C_1$-$C_{30}$)fluoroalkyl which contains one or more fluorine atoms and optionally contains one or more oxygen atoms; n=0,1 or 2, (b) immersing the substrate in a mixed monomer solution mainly containing acrylamide and N,N'-methylenebisacrylamide, (c) adding diammonium cerium (IV) nitrate, and (d) carrying out graft polymerization of the above mentioned mixed monomers on the substrate surface under normal pressure, wherein an amount of diammonium cerium (IV) nitrate added is from 0.01 g to 1 g per 1 g of mixed monomers.

According to a yet further aspect of the present invention, there is provided a method of producing a contact lens comprising (a) carrying out discharging treatment under normal or reduced pressure of a surface of a substrate which is produced from a polymer of a methacrylic ester, and a fumaric ester which is a copolymer of alkyl methacrylate and alkyl fumarate, fluoroalkyl fumarate and siloxanyl fumarate which is expressed as the following general formula:

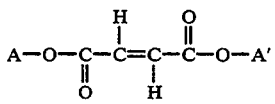

wherein, A and A' are selected from a group consisting of ($C_1$-$C_5$) alkyl or D, and D is a group having the following general formula:

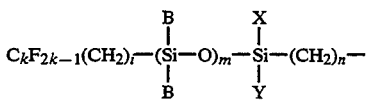

wherein X and Y are selected from a group consisting of ($C_1$-$C_5$) alkyl and $Z_2$, and $Z_2$ is a group having the following general formula:

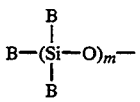

wherein, B is ($C_1$-$C_5$) alkyl, k, i, m, and n are 0 or positive integral numbers, (b) immersing the substrate in a mixed monomer solution, for example, mainly containing acrylamide and N,N'-methylenebisacrylamide, (c) adding diammonium cerium (IV) nitrate, and (d) carrying out graft polymerization of the above mentioned mixed monomers on the substrate surface under normal pressure, wherein an amount of diammonium cerium (IV) nitrate added ranges from 0.01 g to 1 g per 1 g of the mixed monomers.

According to a yet further aspect of the present invention, there is provided a method of producing a contact lens comprising (a) carrying out discharging treatment under normal or reduced pressure of a surface of a substrate which is produced from a polymer of a methacrylic ester, which is a copolymer containing at least one compound selected from methacryloxyalkyl polysiloxane or acryloxyalkyl expressed as the following general formula:

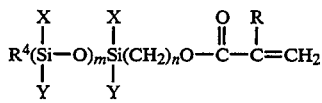

wherein $R=CH_3$ or H; $X=(C_1-C_6)$ alkyl, cyclohexyl, phenyl or Z; $Y=(C_1-C_6)$ alkyl, cyclohexyl, phenyl or $Z_1$;

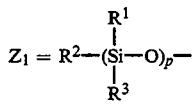

$R^1=(C_1-C_6)$ alkyl, cyclohexyl or phenyl; $R^2=(C_1-C_6)$ alkyl, cyclohexyl or phenyl; $R^3=(C_1-C_6)$ alkyl, cyclohexyl or phenyl; $R^4=(C_1-C_6)$ alkyl, cyclohexyl or phenyl; $m=1-3$, $n=1-5$, $p=1-3$, a fluoroalkyl methacrylate or fluoroalkyl acrylate having up to 20 fluorine atoms, which is expressed as the following general formula:

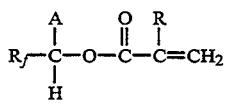

wherein, $R=CH_3$ of H; $A=H$, cyclohexyl, phenyl or $R_f$;

$R_f$=polyfluoroalkyl or pentafluorophenyl; a methacryloxyalkyl polyfluoroalkyl siloxane or an acryloxyalkyl polyfluoroalkyl siloxane expressed as the following general formula:

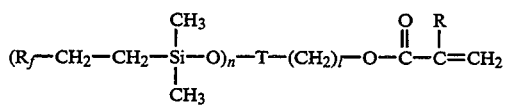

wherein, $R=Ch_3$ or H; $R_f=(C_1-C_4)$ fluoroalkyl, $l=1-4$; $T-SiH_2$, $Si(CH_3)_2$ or $SiHCH_3$; $n=1—3$; a methacryloxyalkyl silanol or an acryloxyalkyl silanol expressed as the following general formula:

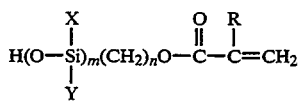

wherein, $R=CH_3$ or H; $X$, $Y=(C_1-C_6)$ alkyl, phenyl or $Z_1$;

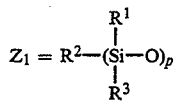

$m=1-3$; $n=1-5$; $p=1-3$; $R^1=(C_1-C_6)$ alkyl, cyclohexyl or phenyl, $R^2=(C_1-C_6)$ alkyl, cyclohexyl or phenyl; $R^3=(C_1-C_6)$ alkyl, cyclohexyl or phenyl; a polymethacryloxyalkyl polysiloxane or a polyacryloxyalkyl polysiloxane expressed as the following general formula:

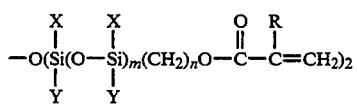

wherein $R=CH_3$ or H; $m=0-3$; $n=1-5$, $X=(C_1-C_6)$ alkyl, cyclohexyl, phenyl or $Z_1$; $Y=(C_1-C_6)$ alkyl, cyclohexyl, phenyl or Z;

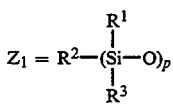

$p=1-3$; $(C_1-C_6)$ alkyl, cyclohexyl or phenyl, $R^2(C_1-C_6)$ alkyl, cyclohexyl or phenyl; $R^3=(C_1-C_6)$ alkyl, cyclohexyl or phenyl; a fluorine containing siloxanyl methacrylate expressed as the following general formula:

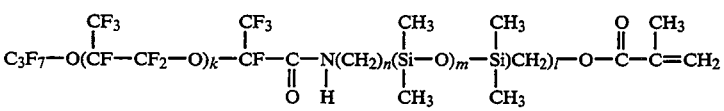

wherein, $l=1-3$; $m=1-10$; $n=1-3$, $k=1-3$, a fluorine containing acrylic or methacrylic ester type monomer expressed as the following general formula:

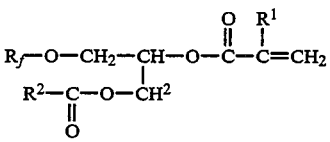

wherein, $R_f=(C_1-C_{30})$ fluoroalkyl which contains three or more fluorine atoms and optionally contains one or more oxygen atoms, $R^1=CH_3$ or H; $R^2=(C_1-C_{30})$ alkyl, which optionally contains one or more fluorine atoms or one or more oxygen atoms; a fluorine containing acrylic or methacrylic ester type monomer expressed as the following general formula:

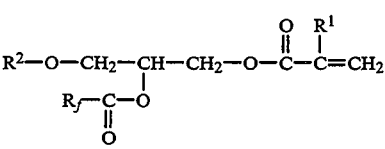

wherein, $R_f=(C_1-C_{30})$ fluoroalkyl which contains three or more fluorine atoms and optionally contains one or more oxygen atoms, $R^1=CH_3$ or H; $R^2=(C_1-C_{30})$ alkyl, which optionally contains one or more fluorine atoms or one or more oxygen atoms; a fluorine containing diacrylate or dimethacrylate type monomer expressed as the following general formula:

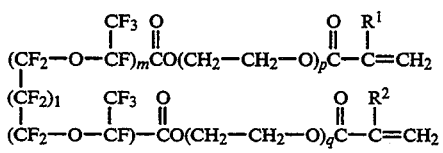

wherein, $R_1$, $R_2$-$CH_3$ or H; $l=2-4$; p, $q=1$ or 2; m and n are such integral numbers that the total of them is within the range of 1-20), and fluorine contained cyclic olefin expressed as the following general formula:

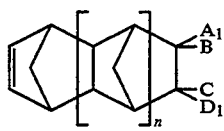

wherein, $A_1=H$, F or an alkyl; $B=H$, F or an alkyl; $C=H$, F or an alkyl; and $D_1=F$ or $(C_1-C_{30})$fluoroalkyl which contains one or more fluorine atoms and optionally contains one or more oxygen atoms; $n=0,1$ or 2, (b) immersing the substrate in a mixed monomer solution mainly containing acrylamide and N,N'-methylenebisacrylamide, (c) adding ferrous ammonium sulfate (Mohr's salt) in an amount from 0.02 g to 0.6 g per 1 g of mixed monomers.

According to a yet further aspect of the present invention, there is provided a method of producing a contact lens comprising (a) carrying out discharging treatment under normal or reduced pressure on a surface of a substrate which is produced from a polymer of a methacrylic ester, and a fumaric ester which is a copolymer of alkyl methacrylate and alkyl fumarate, fluoroalkyl fumarate and siloxanyl fumarate which is expressed as the following general formula:

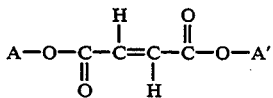

wherein, A and A' are selected from a group consisting of $(C_1-C_5)$ alkyl and D, and D is a group having the following general formula:

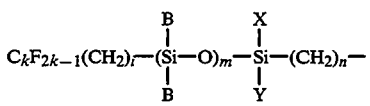

wherein X and Y are selected from a group consisting of $(C_1-C_5)$ alkyl and $Z_2$, and $Z_2$ is a group having the following general formula:

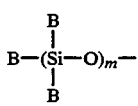

wherein, B is $(C_1-C_5)$ alkyl, k, i, m, and n are 0 or positive integral numbers, (b) immersing the substrate in a mixed monomer solution mainly containing acrylamide and N,N'-methylenebisacrylamide, (c) adding ferrous ammonium sulfate (Mohr's salt), and (d) carrying out graft polymerization of the above mentioned mixed monomers on the substrate surface under reduced pressure, wherein an amount of ferrous ammonium sulfate (Mohr's salt) to be added is from 0.02 g to than 0.06 g per 1 g of the mixed monomers.

According to a yet further aspect of the present invention, there is provided a method of producing a contact lens comprising (a) carrying out discharging treatment under normal pressure or reduced pressure of a surface of a substrate which is produced from a polymer of a methacrylic ester, which is a copolymer containing at least one or more compounds selected from methacryloxyalkyl polysiloxane or acryloxyalkyl polysiloxane expressed as the following general formula:

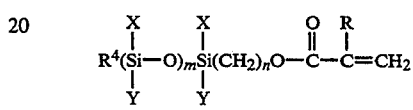

wherein $R=CH_3$ or H; $X=(C_1-C_6)$ alkyl, cyclohexyl, phenyl or $Z_1$; $Y=(C_1-C_6)$ alkyl, cyclohexyl, phenyl or $Z_1$;

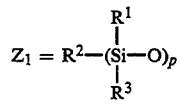

$R^1=(C_1-C_6)$ alkyl, cyclohexyl or phenyl, $R^2=(C_1-C_6)$ alkyl, cyclohexyl or phenyl; $R^3=(C_1-C_6)$ alkyl, cyclohexyl or phenyl; $R^4=(C_1-C_6)$ alkyl, cyclohexyl or phenyl; $m=1-3$, $n=1-5$, $p=1-3$; a fluoroalkyl methacrylate or a fluoroalkyl acrylate having up to 20 fluorine atoms, which is expressed as the following general formula:

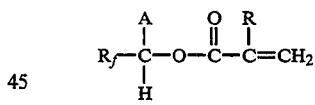

wherein, $R=CH_3$ or H; $A=H$, cyclohexyl, phenyl or $R_f$; $R_f=$polyfluoroalkyl or pentafluorophenyl; a methacryloxyalkyl polyfluoroalkyl siloxane or an acryloxyalkyl polyfluoroalkyl siloxane expressed as the following general formula:

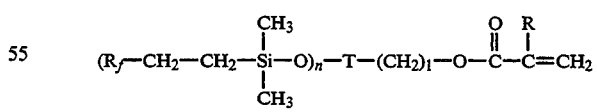

wherein, $R=Ch_3$ or H; $R_f=(C_1-C_4)$ fluoroalkyl, $l=1-4$; $T=SiH_2$, $Si(CH_3)_2$ or SiHCH; $n=1-3$; a methacryloxyalkyl silanol or an acryloxyalkyl silanol expressed as the following general formula:

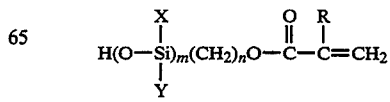

wherein R=CH₃ or H; X, Y=(C₁-C₆) alkyl, phenyl or Z₁;

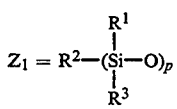

m=1-3; n=1-5; p=1-3; R¹=(C₁-C₆) alkyl, cyclohexyl or phenyl, R²=(C₁-C₆) alkyl, cyclohexyl or phenyl; R³=(C₁-C₆) alkyl, cyclohexyl or phenyl; a polymethacryloxyalkyl polysiloxane or a polyacryloxyalkyl polysiloxane expressed as the following general formula:

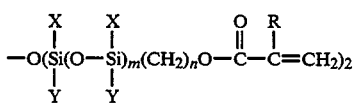

wherein R=CH₃ or H; m=0-3; n=1-5, X=(C₁-C₆) alkyl, cyclohexyl, phenyl or Z; Y=(C₁-C₆) alkyl, cyclohexyl, phenyl or Z;

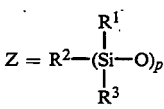

p=1-3; R¹=(C₁-C₆) alkyl, cyclohexyl or phenyl, R²=(C₁-C₆) alkyl, cyclohexyl or phenyl; R³=(C₁-C₆) alkyl, cyclohexyl or phenyl), a fluorine containing siloxanyl methacrylate expressed as the following general formula:

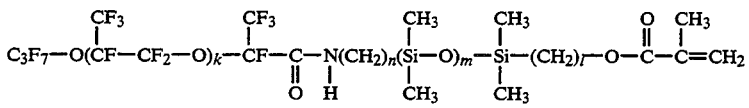

wherein, i=1-3; m=1-10; n=1-3, k=1-3; a fluorine containing acrylic or methacrylic ester type monomer expressed as the following general formula:

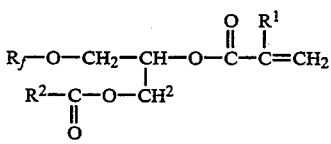

wherein, R$_f$=(C₁-C₃₀) fluoroalkyl which contains three or more fluorine atoms and optionally contains one or more oxygen atoms, R¹-CH₃ or H; R²=(C₁-C₃₀) alkyl, which optionally contains one or more fluorine atoms or one or more oxygen atoms, a fluorine containing acrylic or methacrylic ester type monomer expressed as the following general formula:

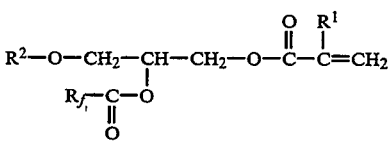

wherein, R$_f$=(C₁-C₃₀) fluoroalkyl which contains three or more fluorine atoms and optionally contains one or more oxygen atoms, R¹=CH₃ or H; R²=(C₁-C₃₀) alkyl, which optionally contains one or more fluorine atoms or one or more oxygen atoms; a fluorine containing diacrylate or dimethacrylate type monomer expressed as the following general formula:

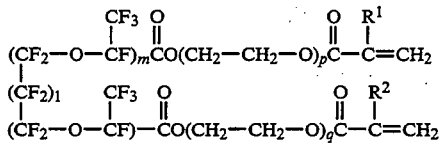

wherein, R¹, R² represent —CH₃ or H; l=2-4; p, q=1 or 2; m and n are integral numbers within the range of 1-20; and a fluorine containing cyclic olefin expressed as the following general formula:

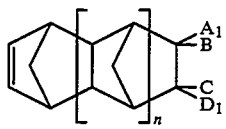

wherein A₁=H, F or an alkyl; B=H, F or an alkyl; C=H, F or an alkyl; and D₁=F or (C₁-C₃₀)fluoroalkyl which contains one or more fluorine atoms and optionally contains one or more oxygen atoms; n=0, 1 or 2, (b) carrying out graft polymerization of a hydrophilic monomer on the substrate surface, wherein ultrasonic waves are applied to the hydrophilic monomer solution under vacuum during the above-mentioned step (b).

According to a yet further aspect of the present invention, there is provided a method of producing a contact lens, wherein an output power of the above mentioned ultrasonic waves is equal to or greater than 10 watts, and the application time is from 10 seconds to 10 minutes.

Some of the presentative compounds of the above mentioned general formulas include: fluorobutylhexamethyltrisiloxanyl methacrylate; trifluoroethyl methacrylate; and trifluoropropyltetramethyldisiloxanylmethyl methacrylate.

Representative fumarates include the following compounds: dimethyl fumarate; bis(pentamethyl disiloxanylmethyl)fumarate; and bis(trifluoroethyl)fumarate.

Cross-linking agents which can be employed to practice the present invention comprise at least one compound selected from the group consisting of glycerine diacrylate, trimethylol propane triacrylate, ethylene glycol dimethacrylate, diethylene glycol dimethacrylate, and 1,3-butanediol dimethacrylate.

In addition, other cross-linking agents comprise N,N'-methylenebisacrylamide, and the concentration of the N,N'-methylenebisacrylamide in the hydrophilic monomer aqueous solution which comprises at least acrylamide, N,N'-methylenebisacrylamide and water is equal to or less than 10% by weight.

The graft polymer is made of acrylamide and N,N'-methylenebisacrylamide, and a body to form the hydrogen bond comprises acrylic acid.

Addition of a reducing agent (such as Mohr's salt or a cerium salt) to the polymerization system results in lowering reaction temperature due to its catalytic activity and decreases the thermal burden on the substrate.

A method of the present invention which comprises addition of a reducing agent, especially Mohr's salt, requires a more precise control than required by current polymerization reactions initiated by heating homogeneous systems containing concentrations of components (including the concentration of the reducing agent) and amounts of the dissolved oxygen. When these parameters are not appropriately balanced, a graft chain might be extended too much and increase the viscosity of the solution in the system (gelation) or the polymerization reaction itself might not take place. In the former case, which corresponds to cases in which the amount of dissolved oxygen in the system is extremely small, or the monomer concentration is higher than the optimal condition, the obtained graft layer on the substrate surface becomes cloudy, and transmittance in the visible region is lowered. In the latter case (in which the amount of dissolved oxygen is large) the surface modification cannot be achieved.

As it is shown in the present invention, by employing a dissolved oxygen removal method in which the system is kept under vacuum conditions while ultrasonic waves are applied, highly precise control over the homogeneity of the system's concentrations of components (including the concentration of the reducing agent) and over the amount of the dissolved oxygen can be achieved.

When ultrasonic waves are applied to the polymerization system, wave energy is first converted into vibrational energy of molecules in the system. Through vibrational energy, applied energy is converted further into thermal energy and causes a local temperature rise. The boiling point is determined by the degree of vacuum (pressure) in the system, but when temperatures exceed the boiling point by the aforementioned local temperature rise, there occurs deoxygenation due to the boiling. The probability of local deoxygenation occurring is proportional to the amount of the dissolved oxygen at such instant, thus the dissolved oxygen decreases exponentially and nonlinearly to the ultrasonic wave application period. The time constant of the exponent part is decided by such factors as the volume of the vacuum system, and the output of the ultrasonic wave application device, and the value can be experimentally obtained from the change in the amount of the dissolved oxygen with time. On the other hand, the concentrations of the components in the system increase in proportion to time when the system is kept under vacuum. This is because solvent evaporates at an almost constant rate. Concentration rate is decided by such factors as the volume of the vacuum system and the displacement of an evacuating pump used for the vacuum system.

By the above mentioned function, when the device parameters are optimized, the amount of dissolved oxygen and concentrations of components in the system can be highly precisely controlled only with time control.

Removal of dissolved oxygen by ultrasonic wave application has another merit that when it is applied to current graft polymerization processes initiated by heating, it can eliminate the complications of the procedure. In accordance with the present invention, a cerium salt is also used as the reducing agent, and since the cerium salt has a function of accelerating the graft polymerization reaction, even under the presence of dissolved oxygen, the purpose can be achieved in a very simple step.

Referring to the property of the contact lens substrate, since the fumarate type substrate and the fluorine containing substrate used in the present invention have higher efficiencies of producing a peroxide on the substrate surface by discharge treatment than those of the methacrylate (which does not contain silicon or fluorine) type substrate or siloxanyl methacrylate (which does not contain fluorine) type substrate, they allow introduction of dense polymerization initiating points. Among them, the fluorine containing type substrate has the highest peroxide generation efficiency. The higher the density of the polymerization initiating point is, the more the reaction time required for the surface graft polymerization can be shortened; thus the fumarate type substrate and the fluorine containing type substrates used in the present invention have the following advantages.

When the reducing agent is oxidized during the polymerization reaction, it causes a color change reaction (for example in the case of Mohr's salt, the color is changed from colorless transparent to yellow). When the time required for the polymerization reaction is long, the original contact lens substrate changes color as well. As for the fumarate type substrate and the fluorine containing type substrate used in the present invention, since they have short polymerization reaction times due to the above mentioned reason, the discoloration of the substrate rarely occurs. In the case of the fluorine containing type substrate having the shortest reaction time, it has a merit of causing absolutely no discoloration during the surface graft polymerization.

Among the contact lenses having high oxygen permeability and thus little water wettability, those containing fluorine especially show weak bonding strength with the hydrophilic graft polymer. As described above, by such a means as adding a cross-linking agent to a monomer solution, the graft polymer grafted on the surface of the substrate has a cross-linking structure between neighboring polymers via a cross linking agent or hydrogen bonding. When mechanical stress is applied from outside on the graft surface, the external stress is dispersed among the polymer chains through the cross-linking structure, and the rubbing resistance can be improved. However, adding a cross-linking agent and the like to the monomer solution during the graft polymerization means that the composition of the solution becomes multicomponent. In such a case, by shaking the polymerization system as it is shown in the present invention, the homogeneity of the solution components can be improved, and the obtained graft surface can have a cross-linking structure wherein the density of cross-linkages of the graft polymers are uniform over the surface. Accordingly, regarding the rubbing resistance, the in-plane homogeneity of the bonding strength of the graft film on the substrate surface becomes good. From the optical viewpoint, it provides a surface treated condition that is free from any abnormal refraction region, and gives high transmittance.

When the polymerization system is shaken, the substrate moves randomly in a vessel, and a crack or a scratch might be generated in the substrate when it is contacted with the wall of the vessel. Especially for such a substrate that requires a long time for graft polymerization, the number of its contacts with the vessel's wall is increased, and the scratch tends to be generated. As it is described in the present invention, when the substrate is placed in a protection jig, the range of the movement of the substrate during the polymerization treatment can be confined in a narrow space, the contact between the substrate and the wall of the vessel can be prevented, and neither crack nor scratch is generated in the substrate. Also by selecting a specific substrate, a similar effect can be obtained. For example, the graft polymerization is initiated by decomposing in a monomer solution, a peroxide generated on the surface of the substrate by discharging treatment, and the graft polymerization speed is quicker, the more the peroxide is generated on the surface of the substrate. And the amount of the peroxide generated is specific to the substrate composition, thus, the polymerization time can be shortened by selecting such a lens substrate that will generate a large amount of the peroxide, as the substrate to be grafted. In such a case, since the number of the contacts between the lens and the wall of the vessel is decreased, the problem such as the scratch of the substrate can be solved. The short polymerization time is also effective to prevent heat deformation or deterioration of the substrate when the polymerization is carried out by heating.

The present invention will be described in more detail, employing the following illustrative examples.

EXAMPLE 1

5 g of N,N'-methylenebisacrylamide (as a cross-linking agent) and 35 g of acrylamide were dissolved in distilled water to prepare a monomer aqueous solution of 100 ml.

The graft polymerization was carried out as follows. A contact lens substrate, which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was prepared in a normal contact lens form.

The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. After the discharge-treated lens substrate was exposed to air for a while, it was placed in a test tube having a diameter of 18 mm, 3 ml of the above mentioned monomer aqueous solution was added, and 0.1 g of diammonium cerium (IV) nitrate was put in and stirred well to be dissolved. After the top of the test tube was sealed with a silicon stopper, surface graft reaction was carried out in a thermostatic bath at 50° C. for 60 minutes. After the reaction was completed, the lens was taken out of the test tube and immersed in pure water at 50° C. for 20 hours to remove the homopolymer and the like adhered on the surface. The water wettability of the lens surface was examined to find out if the hydrophilic polymer, polyacrylamide (containing N,N'-methylenebisacrylamide as the cross-linking agent) was grafted on the surface of the contact lens obtained by these procedures. The contact angle of pure water measured with contact angle meter, TYPE CA-D (KYOWA KAIMENKAGAKU CO., LTD) was 18°. This value was the same as the contact angle of the contact lens surface obtained by prior art production method (in which the dissolved oxygen was removed under vacuum, and the reaction system was heated at about 80° C. to carry out the surface graft treatment). On the other hand, a pure water contact angle of the lens substrate on which no surface graft treatment was given was measured for comparison, and it was 90°.

As described above, in accordance with the present invention, by adding diammonium cerium (IV) nitrate as a reducing agent, the peroxide introduced on the contact lens substrate surface by discharge treatment could be decomposed at as low a temperature as 50° C., and radicals which provide the polymerization initiating points could be produced. Furthermore, it was shown that the method of the present invention comprising addition of diammonium cerium (IV) nitrate, can carry out hydrophilization of the contact lens surface by graft treatment, even without removing the dissolved oxygen.

EXAMPLE 2

5 g of N,N'-methylenebisacrylamide (as a cross-linking agent) and 35 g of acrylamide were dissolved in distilled water to prepare a monomer aqueous solution of 100 ml.

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was prepared in a normal contact lens form. Ten sheets of such contact lens substrate was prepared.

The lens substrate was installed, one by one, in a space produced by spacer having a thickness of 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side. After the discharge treatment, lens substrate was placed in a test tube having a diameter of 18 mm, 3 ml of the above mentioned monomer aqueous solution was added, and a predetermined amount (see Table 1) of diammonium cerium (IV) nitrate was put in, stirred well and dissolved. After the top of the test tube was sealed with a silicon stopper, surface graft reaction was carried out in a thermostatic bath at 50° C. for 60 minutes. After the reaction was completed, the lens was taken out of the test tube and immersed in pure water at 50° C. for 20 hours to remove the homopolymer and the like adhered on the surface. Ninhydrin method was employed to find out if polyacrylamide (containing N,N'-methylenebisacrylamide as the cross-linking agent) was determined from the resulting coloration.

Referring to 10 lens substrates treated by graft polymerization (Samples 1–10), the determination of the polyacrylamide (including N,N'-methylenevisacrylamide as the cross-linking agent) grated on the lens surface was carried out by ninhydrin reaction and the surface condition was observed by optical microscope. The results are shown in Table 1. From Table 1, it is clear that Sample 1 and Sample 2, in which the amount of diammonium cerium (IV) nitrate was less than 0.01 g per 1 g of the monomers (N,N'-methylenebisacrylamide and acrylamide), the polyacrylamide (including N,N'-methylenebisacrylamide as the cross-linking agent) was not grafted on the lens substrate surface. On the other hand, when the amount of diammonium cerium (IV) nitrate added was more than 1 g per 1 g of the monomers (N,N'-methylenebisacrylamide and acrylamide), i.e., in the cases of Sample 9 and Sample 10, the lens surface became cloudy due to too much grafting, thus such treatment condition was found out to be inappropriate. From Sample 3 and Sample 8, in which the amount of diammonium cerium (IV) nitrate added was equal to or more than 0.01 g and equal to or less than 1 g per 1 g of the monomers (N,N'-methylenebisacrylamide and acrylamide), good surface graft treatment could be carried out.

TABLE 1

| | Amount of cerium (IV) salt added *(g) | Amount of graft (μg/cm)² | Surface condition |
|---|---|---|---|
| Sample 1 | 0.001 | 0.0 | — |
| 2 | 0.009 | 0.0 | — |
| 3 | 0.01 | 5.0 | good |
| 4 | 0.02 | 6.5 | good |
| 5 | 0.05 | 8.0 | good |
| 6 | 0.1 | 12.5 | good |
| 7 | 0.5 | 32.0 | good |
| 8 | 1.0 | 50.0 | good |
| 9 | 1.1 | 60.5 | cloudy (bad) |
| 10 | 2.0 | 82.5 | cloudy (bad) |

*amount (g) added per 1 go of the monomers

EXAMPLE 3

5 g of N,N'-methylenebisacrylamide (as a cross-linking agent) and 35 g of acrylamide were dissolved in distilled water to prepare a monomer aqueous solution of 100 ml.

The graft polymerization was carried out as follows. A contact lens substrate which was made of a copolymer of alkyl fumarate, siloxanyl fumarate, fluoroalkyl fumarate, and methyl methacrylate was prepared in a normal contact lens form.

The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. After the discharge-treated lens substrate was exposed to air for a while, it was placed in a test tube having a diameter of 18 mm, 3 ml of the above mentioned monomer aqueous solution was added, and 0.1 g of diammonium cerium (IV) nitrate was put in, stirred well and dissolved. After the top of the test tube was sealed with a silicon stopper, surface graft reaction was carried out in a thermostatic bath at 50° C. for 60 minutes. After the reaction was completed, the lens was taken out of the test tube and immersed in pure water at 50° C. for 20 hours to remove the homopolymer and the like adhered on the surface. The water wettability of the lens surface was examined to find out if the hydrophilic polymer, polyacrylamide (containing N,N'-methylenebisacrylamide as the cross-linking agent) was grafted on the surface of the contact lens obtained by these procedures. The contact angle of pure water measured with contact angle meter, TYPE CA-D (KYOWA KAIMENKAGAKU CO., LTD) was 18°. This value was the same as the contact angle of the contact lens surface obtained by prior art production method (in which the dissolved oxygen was removed under vacuum, and the reaction system was heated at about 80° C. to carry out the surface graft treatment). On the other hand, a pure water contact angle of the lens substrate on which no surface graft treatment was given was measured for comparison, and it was 90°.

As described above, in accordance with the present invention, by adding diammonium cerium (IV) nitrate as a reducing agent, the peroxide introduced on the contact lens substrate surface by discharge treatment could be decomposed at a low temperature as 50° C., and radicals which provide the polymerization initiating points could be produced. Furthermore, it was shown that the method of the present invention comprising addition of diammonium cerium (IV) nitrate, can carry out hydrophilization of the contact lens surface by graft treatment, even without removing the dissolved oxygen.

EXAMPLE 4

5 g of N,N'-methylenebisacrylamide (as a cross-linking agent) and 35 g of acrylamide were dissolved in distilled water to prepare a monomer aqueous solution of 100 ml.

The graft polymerization was carried out as follows. A contact lens substrate which was made of a copolymer of alkyl fumarate, siloxanyl fumarate, fluoroalkyl fumarate, and methyl methacrylate was prepared in a normal contact lens form. 10 sheets of such contact lens substrate was prepared.

The lens substrate was installed, one by one, in a space produced by spacer having a thickness of 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side. After the discharge treatment, lens substrate was placed in a test tube having a diameter of 18 mm, one by one, 3 ml of the above mentioned monomer aqueous solution was added, and a predetermined amount (see Table 1) of diammonium cerium (IV) nitrate was put in, stirred well and dissolved. After the top of the test tube was sealed with a silicon stopper, surface graft reaction was carried out in a thermostatic bath at 50° C. for 60 minutes. After the reaction was completed, the lens was taken out of the test tube and immersed in pure water at 50° C. for 20 hours to remove the homopolymer and the like adhered on the surface. Ninhydrin method was employed to find out if the hydrophilic polymer, polyacrylamide (containing N,N'-methylenebisacrylamide as the cross-linking agent) was grafted on the surface of the contact lens obtained by these procedures. Polyacrylamide (containing N,N'-methylenebisacrylamide as the cross-linking agent) grafted on the surface was hydrolyzed with hydrochloric acid, and ninhydrin was added after neutralization. The amount of the polyacrylamide (containing N,N'-methylenebisacrylamide as the cross-linking agent) was determined from the resulting coloration.

Referring to 10 lens substrates treated by graft polymerization (Samples 1–10), the determination of the polyacrylamide (including N,N'-methylenevisacrylamide as the cross-linking agent) grated on the lens surface was carried out by ninhydrin reaction and the surface condition was observed by optical microscope.

The results are shown in Table 2. From Table 2, it is clear that Sample 1 and Sample 2, in which the amount of diammonium cerium (IV) nitrate was less than 0.01 g per 1 g of the monomers (N,N'-methylenebisacrylamide and acrylamide), the polyacrylamide (including N,N'-methylenebisacrylamide as the cross-linking agent) was not grafted on the lens substrate surface. On the other hand, when the amount of diammonium cerium (IV) nitrate added was more than 1 g per 1 g of the monomers (N,N'-methylenebisacrylamide and acrylamide), i.e., in the cases of Sample 9 and Sample 10, the lens surface became cloudy due to too much grafting; thus such treatment condition was found out to be inappropriate. From Sample 3 and Sample 8, in which the amount of diammonium cerium (IV) nitrate added was equal to or more than 0.01 g and equal to or less than 1 g per 1 g of the monomers (N,N'-methylenebisacrylamide and acrylamide), good surface graft treatment could be carried out.

TABLE 2

| | Amount of cerium (IV) salt added *(g) | Amount of graft (μg/cm)² | Surface condition |
|---|---|---|---|
| Sample 1 | 0.001 | 0.0 | — |
| 2 | 0.009 | 0.0 | — |
| 3 | 0.01 | 5.0 | good |
| 4 | 0.02 | 6.5 | good |
| 5 | 0.05 | 8.0 | good |
| 6 | 0.1 | 12.5 | good |
| 7 | 0.5 | 32.0 | good |
| 8 | 1.0 | 50.0 | good |
| 9 | 1.1 | 60.5 | cloudy (bad) |
| 10 | 2.0 | 82.5 | cloudy (bad) |

*amount (g) added per 1 g of the monomers

EXAMPLE 5

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(-trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was prepared. The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. After the discharge-treated lens substrate was exposed to air, it was placed in a test tube.

7 g of acrylamide and 1 g of N,N'-methylenebisacrylamide were dissolved in 12 g of pure water to prepare a monomer aqueous solution. 2.5 ml of the monomer aqueous solution was put in the test tube and 0.0361 g of ferrous ammonium sulfate (Mohr's salt) was added, stirred and dissolved. The discharge treated lens substrate was put in it and after replacing the atmosphere with nitrogen gas, the tube was sealed under reduced pressure. The test tube was put in a thermostatic chamber at 45° C. for 15 minutes, and the monomers were graft polymerized on the surface of the lens substrate. 6 samples were prepared by identical procedures (Sample No. 1-6).

To compare with the prior art process, another 6 samples were prepared by using a monomer aqueous solution to which ferrous ammonium sulfate (Mohr's salt) was not added (Comparative Example No. 1-6). The polymerization temperature employed was 80° C., the polymerization time was 15 minutes and the discharging conditions were identical with those employed for the samples in which the ferrous ammonium sulfate (Mohr's salt) was added (Sample No. 1-6).

Curvature of the lens having received the graft treatment was then measured and compared with that measured before the treatment, and the amount of the change was obtained. In order to evaluate the water wettability of the lens surface, the contact angle was measured by the sessile drop method. The results are shown in Table 3.

TABLE 3

| | Curvature change % | Contact angle θ/2 deg |
|---|---|---|
| Sample No. | | |
| 1 | 0 | 13 |
| 2 | 1 | 15 |
| 3 | 1 | 18 |
| 4 | 1 | 18 |
| 5 | 1 | 16 |
| 6 | 1 | 15 |
| Comparative example 1 | 6 | 21 |
| 2 | 8 | 20 |
| 3 | 8 | 13 |
| 4 | 9 | 15 |
| 5 | 5 | 21 |
| 6 | 8 | 15 |

As it is clear from Table 3, the change in curvature of the lens was not less than 5% for all of the comparative examples produced by the prior art polymerization method initiated by heating, while all of the samples produced by the method of the present invention, in which ferrous ammonium sulfate (Mohr's salt) was added to lower the reaction temperature, showed a change in curvature of not more than 1%. The water wettability of the lens surface of the samples produced by the method of the present invention, evaluated with the contact angle, was not at all inferior to those produced by the conventional polymerization method initiated by heating. It became clear that the method of the present invention can provide good surface graft treatment.

EXAMPLE 6

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy) disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) (only as a polymerization initiator) 0.25 wt %, was prepared. The lens substrate was installed in a space produced by spacers having 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side. 35 g of acrylamide and 5 g of N,N'-methylenebisacrylamide were dissolved in 40 g of pure water to prepare a monomer aqueous solution. 1.568 g of ferrous ammonium sulfate hexahydrate (Mohr's salt) was dissolved in 10 g of pure water to prepare a Mohr's salt aqueous solution, 2.4 of the monomer aqueous solution 0.3 ml of the Mohr's salt aqueous solution and 0.3 ml of pure water were put in a test tube and stirred. The discharge treated lens substrate was put in it and after replacing the atmosphere with nitrogen gas, the tube was sealed under reduced pressure. The test tube was put in a thermostatic chamber at 35° C. for 5-60 minutes, and the monomers were graft polymerized on the surface of the lens substrate. 6 samples were prepared by identical procedures (Sample No. 1-6).

To compare with the prior art process, another 6 samples were prepared by using a monomer aqueous solution to which ferrous ammonium sulfate (Mohr's salt) was not added (Comparative Example No. 1-6). The polymerization temperature employed was 80° C. the polymerization time was 20 minutes and the discharging conditions were identical with those employed for the samples in which the ferrous ammonium sulfate (Mohr's salt) was added (Sample No. 1-6).

Curvature of the lens having received the graft treatment was then measured and compared with that measured before the treatment, and the amount of the change was obtained. In order to evaluate the water wettability of the lens surface, the contact angle was measured by the sessile drop method. The results are shown in Table 3.

TABLE 4

| Sample No. | Curvature change % | Contact angle $\theta/2$ deg |
|---|---|---|
| 1 | 0 | 14 |
| 2 | 1 | 15 |
| 3 | 1 | 19 |
| 4 | 1 | 18 |
| 5 | 1 | 17 |
| 6 | 0 | 15 |
| Comparative example 1 | 8 | 22 |
| 2 | 6 | 23 |
| 3 | 8 | 13 |
| 4 | 9 | 19 |
| 5 | 7 | 13 |
| 6 | 6 | 17 |

As it is clear from Table 4, the change in curvature of the lens was not less than 5% for all of the comparative examples produced by prior art polymerization method initiated by heating, while all of the samples produced by the method of the present invention, in which ferrous ammonium sulfate (Mohr's salt) was added to lower the reaction temperature, showed a change in curvature of not more than 1%. The water wettability of the lens surface of the samples produced by the method of the present invention, evaluated with the contact angle, was not at all inferior to those produced by the conventional polymerization method initiated by heating. It became clear that the method of the present invention can provide good surface graft treatment.

For illustration, acrylamide was used as the hydrophilic monomer and N,N'-methylenebisacrylamide was used as the cross-linking agent in the embodiments of the present invention; however, we have confirmed that other hydrophilic monomers such as 2-hydroxyethyl methacrylate, polyvinyl alcohol, N-vinyl pyrolidone, polyethylene oxide, dimethyl acrylamide provide similar results. The similar results were also obtained by the use of other cross-linking agents such as glycerine diacrylate, trimethylol propane triacrylate (acrylate type), and ethylene glycol dimethacrylate, diethylene glycol dimethacrylate, triethylene glycol dimethacrylate and 1,3-butanediol dimethacrylate (methacrylate type).

EXAMPLE 7

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(y-methacryloxypropyl)-1,1,3,3-tetrakis(-trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was prepared. The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. The lens substrate was exposed to air after the discharge treatment.

Monomer aqueous solution was prepared as follows. 35 g of acrylamide and 5 g of N,N'-methylenebisacrylamide were weighed and dissolved in 40 g of water. Hereinafter it is called as solution A. 1.568 g (0.04 mol) of ferrous ammonium sulfate hexahydrate was weighed and dissolved in 10 g of water. Hereinafter it is called solution B.

2.4 ml of solution A and 0.15 ml of solution B were put in a test tube and 0.45 ml of water was added to it to prepare a polymerization solution. The composition of the polymerization aqueous solution comprises about 1.05 g of acrylamide, about 0.15 g of N,N'-methylenebisacrylamide and about 0.025 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.02% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for 20 minutes, and the monomers were graft polymerized on the surface of the lens substrate. 2 samples were prepared under the present condition (Sample No. 1, 2).

2.4 ml of solution A and 0.3 ml of solution B were put in a test tube and 0.3 ml of water was added to it to prepare a polymerization solution. The composition of the polymerization aqueous solution comprises about 1.05 g of acrylamide, about 0.15 g of N,N'-methylenebisacrylamide, about 1.8 g of water and about 0.05 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.04% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for 20 minutes, and the monomers were graft polymerized on the surface of the lens substrate. 2 samples were prepared under the present condition (Sample No. 3, 4).

2.4 ml of solution A and 0.45 ml of solution B were put in a test tube and 0.15 ml of water was added to it to prepare a polymerization solution. The composition of the polymerization aqueous solution comprises about 1.05 g of acrylamide, about 0.15 g of N,N'-methylenebisacrylamide and about 0.075 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.06% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for 20 minutes, and the monomers were graft polymerized on the surface of the lens substrate. 2 samples were prepared under the present condition (Sample No. 5, 6).

For comparison, another 4 samples were produced by graft polymerization by using different polymerization solutions in which the ratios of solution B and water were varied (Comparative example No. 1-4). The discharging condition and the polymerization temperature were identical with those used for producing the samples (Sample No. 1-6).

The surface of the lens after the graft treatment was observed by optical microscope to determine if it was cloudy or not. In order to confirm the completion of the graft polymerization treatment, the water wettability of the lens surface was examined with the contact angle measured by the sessile drop method. The results are shown in Table 5.

TABLE 5

| No | Polymerization solution composition ml | | | Surface cloudiness* | Contact angle $\theta$/deg |
|---|---|---|---|---|---|
| | solution A | solution B | water | | |
| 1 | 2.4 | 0.15 | 0.45 | ○ | 46 |
| 2 | 2.4 | 0.15 | 0.45 | ○ | 45 |
| 3 | 2.4 | 0.3 | 0.3 | ○ | 47 |
| 4 | 2.4 | 0.3 | 0.3 | ○ | 47 |
| 5 | 2.4 | 0.45 | 0.15 | ○ | 47 |
| 6 | 2.4 | 0.45 | 0.15 | ○ | 47 |
| Comparative Example 1 | 2.4 | 0 | 0.6 | ○ | 99 |
| 2 | 2.4 | 0.1 | 0.5 | X | 47 |
| 3 | 2.4 | 0.5 | 0.1 | ○ | 98 |
| 4 | 2.4 | 0.6 | 0 | ○ | 98 |

*cloudy: X not cloudy: ○

As it is clear from Table 5, the surface of the Sample No. 1-6 was not cloudy at all. They had a contact angle of below 50°, showing that the graft polymerization progressed without any problem.

Referring to the Comparative examples, a lens in which a small amount of Mohr's salt was added (Comparative Example No. 2) showed a sufficiently low contact angle which indicated the completion of the graft polymerization. However, the surface of the lens was cloudy, indicating that the condition is not appropriate for the surface treatment. Those lenses in which a large amount of Mohr's salt was added (Comparative Examples 3 and 4), showed high contact angles, indicating that the graft polymerization was not progressed. In the case of Comparative Example No. 1 in which no Mohr's salt was added, of course, the polymerization did not proceed.

For illustration, acrylamide was used as the hydrophilic monomer and N,N'-methylenebisacrylamide was used as the cross-linking agent in the embodiments of the present invention; however, we have confirmed that other hydrophilic monomers such as 2-hydroxyethyl methacrylate, polyvinyl alcohol, N-vinyl pyrolidone, polyethylene oxide, dimethyl acrylamide provide similar results. The similar results were also obtained by the use of other cross-linking agents such as glycerine diacrylate, trimethylol propane triacrylate (acrylate type), and ethylene glycol dimethacrylate, diethylene glycol dimethacrylate, triethylene glycol dimethacrylate and 1,3-butanediol dimethacrylate (methacrylate type).

EXAMPLE 8

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy) disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) (only as a polymerization initiator) 0.25 wt %, was prepared The lens substrate was installed in a space produced by spacers having 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side.

Monomer aqueous solution was prepared as follows. 35 g of acrylamide and 5 g of N,N'-methylenebisacrylamide were weighed and dissolved in 40 g of water. Hereinafter it is called solution A. 1.568 g (0.04 mol) of ferrous ammonium sulfate hexahydrate was weighed and dissolved in 10 g of water. Hereinafter it is called solution B.

2.4 ml of solution A and 0.15 ml of solution B were put in a test tube and 0.45 ml of water was added to it to prepare a polymerization solution. The composition of the polymerization aqueous solution comprises about 1.05 g of acrylamide, about 0.15 g of N,N'-methylenebisacrylamide and about 0.025 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.02% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for about 10 minutes, and the monomers were graft polymerized on the surface of the lens substrate. 2 samples were prepared under the present condition (Sample No. 1, 2).

2.4 ml of solution A and 0.3 ml of solution B were put in a test tube and 0.3 ml of water was added to it to prepare a polymerization solution. The composition of the polymerization aqueous solution comprises about 1.05 g of acrylamide, about 0.15 g of N,N'-methylenebisacrylamide, about 1.8 g of water and about 0.05 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.04% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for 10 minutes, and the monomers were graft polymerized on the surface of the lens substrate. 2 samples were prepared under the present condition (Sample No. 3, 4).

2.4 ml of solution A and 0.45 ml of solution B were put in a test tube and 0.15 ml of water was added to it to prepare a polymerization solution. The composition of the polymerization aqueous solution comprises about 1.05 g of acrylamide, about 0.15 g of N,N'-methylenebisacrylamide and about 0.075 g of ferrous ammonium sulfate (Mohr's salt). That means the ratio of the amount of the monomers (total of acrylamide and N,N'-methylenebisacrylamide) in the polymerization system to the amount of the Mohr's salt added was 1% to 0.06% by weight. The discharge treated lens substrate was put in the monomer aqueous solution in the test tube and after replacing the atmosphere with nitrogen gas, the tube was sealed under reduced pressure. The test tube was put in a thermostatic chamber at 35° C. for 10 minutes, and the monomers were graft polymerized on the surface of the lens substrate. 2 samples were prepared under the present condition (Sample No. 5, 6).

For comparison, another 4 samples were produced by graft polymerization by using different polymerization solutions in which the ratios of solution B and water were varied (Comparative example No. 1-4). The discharging condition and the polymerization temperature were identical with those used for producing the samples (Sample No. 1-6).

The surface of the lens after the graft treatment was observed by optical microscope to determine if it was cloudy or not. In order to confirm the completion of the graft polymerization treatment, the water wettability of the lens surface was examined with the contact angle measured by the sessile drop method. The results are shown in Table 6.

TABLE 6

| No | Polymerization solution composition ml | | | Surface cloudiness* | Contact angle θ/deg |
| --- | --- | --- | --- | --- | --- |
| | solution A | solution B | water | | |
| 1 | 2.4 | 0.15 | 0.45 | o | 46 |
| 2 | 2.4 | 0.15 | 0.45 | o | 46 |
| 3 | 2.4 | 0.3 | 0.3 | o | 46 |
| 4 | 2.4 | 0.3 | 0.3 | o | 46 |
| 5 | 2.4 | 0.45 | 0.15 | o | 47 |
| 6 | 2.4 | 0.45 | 0.15 | o | 49 |
| Comparative Example 1 | 2.4 | 0 | 0.6 | o | 98 |
| 2 | 2.4 | 0.1 | 0.5 | X | 47 |
| 3 | 2.4 | 0.5 | 0.1 | o | 99 |
| 4 | 2.4 | 0.6 | 0 | o | 97 |

*cloudy: X  not cloudy: o

As it is clear from Table 6, the surface of the Sample No. 1–6 was not cloudy at all. They had a contact angle of below 50°, showing that the graft polymerization progressed without any problem.

Referring to the Comparative examples, a lens in which a small amount of Mohr's salt was added (Comparative Example No. 2) showed a sufficiently low contact angle which indicated the completion of the graft polymerization. However, the surface of the lens was cloudy, and that tells the condition is not appropriate for the surface treatment. Those lenses in which a large amount of Mohr's salt was added (Comparative Examples 3 and 4), showed high contact angles, indicating that the graft polymerization was not progressed. In the case of Comparative Example No. 1 in which no Mohr's salt was added, of course, the polymerization did not proceed.

For illustration, acrylamide was used as the hydrophilic monomer and N,N'-methylenebisacrylamide was used as the cross-linking agent in the embodiments of the present invention; however, we have confirmed that other hydrophilic monomers such as 2-hydroxyethyl methacrylate, polyvinyl alcohol, N-vinyl pyrolidone, polyethylene oxide, dimethyl acrylamide provide similar results. The similar results were also obtained by the use of other cross-linking agents such as glycerine diacrylate, trimethylol propane triacrylate (acrylate type), and ethylene glycol dimethacrylate, diethylene glycol dimethacrylate, triethylene glycol dimethacrylate and 1,3-butanediol dimethacrylate (methacrylate type).

EXAMPLE 9

10 g of acrylamide was weighed and dissolved in distilled water to prepare a monomer aqueous solution of 100 ml.

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(-trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was prepared.

The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. After the discharge treatment, the lens substrate was exposed to air, placed in a test tube, and the above mentioned acrylamide monomer aqueous solution was added, then Mohr's salt was added, and it was connected to a vacuum system. The test tube was immersed in water filled in a supersonic vibration bath. Then the tube was evacuated with a rotary pump for 1 minute, and supersonic waves having predetermined output were applied to it. After passing one minute, the test tube was sealed under the reduced pressure, and it was immersed in a thermostatic bath at 40° C. for 15 minutes, to try to carry out graft polymerization on the surface of the lens substrate. The outputs of the supersonic waves applied are shown in Table 7, and the results of the surface graft polymerization if it was possible or not, under various conditions are also shown in Table 7.

As it is clear from Table 7, when the output of the supersonic waves was equal to or more than 10 watts, the surface graft polymerization could be carried out. On the other hand, when the output of the supersonic wave was less than 10 watts, the dissolved oxygen in the monomer solution was not fully removed, and the surface graft polymerization could not be achieved.

TABLE 7

| Sample No. | Applied supersonic waves' Output (watt) | Surface grafting was possible | Surface grafting was not possible |
|---|---|---|---|
| 1 | 5 | | o |
| 2 | 10 | o | |
| 3 | 50 | o | |
| 4 | 100 | o | |
| 5 | 300 | o | |
| 6 | 600 | o | |

Apart from the above mentioned samples, the lens substrate was also treated by prior art process which did not employ supersonic waves during polymerization, and in which the removal of the oxygen was carried out by repeating 5 times such series of steps as evacuating a vessel containing the monomer solution, knocking it from outside, replacing the atmosphere in the vessel with nitrogen gas, and re-evacuating the vessel. Although 10 pieces of the lens substrate were treated by the identical procedures, surface grafting was not possible on 3 of them, surface grafting proceeded too far on 7 of them, and in any case, the components' concentrations in the system, and the amount of dissolved oxygen could not be controlled by the prior art process, thus a good product could not be obtained.

EXAMPLE 10

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy) disiloxane 7 wt %, bis(trimethylsiloxy)-γ-methacryloxypropyl silanol 8 wt % methacrylic acid 11 wt %, ethylene glycol dimethacrylate 7 wt %, and 2 2'-azobis(2,4-isobutyronitrile) (only as a polymerization initiator) 0.25 wt %, was prepared.

The lens substrate was installed in a space produced by spacers having 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side. The discharge treated lens substrate was placed in a test tube and then it was treated by procedures analogous to those used in Example 9. The results are shown in Table 8.

Similarly, when the output of the ultrasonic wave was equal to or more than 10 watts, the surface graft polymerization was possible. On the other hand, when the output of the supersonic wave was less than 10 watts, the dissolved oxygen in the monomer solution was not fully removed, and the surface graft polymerization could not be achieved.

TABLE 8

| Sample No. | Applied supersonic waves' Output (watt) | Surface grafting was possible | Surface grafting was not possible |
|---|---|---|---|
| 1 | 5 | | o |
| 2 | 10 | o | |
| 3 | 50 | o | |
| 4 | 100 | o | |
| 5 | 300 | o | |
| 6 | 600 | o | |

Apart from the above mentioned samples, the lens substrate was also treated by prior art process which did not employ ultrasonic waves during polymerization, and in which the removal of the oxygen was carried out by repeating 5 times such series of steps as evacuating a vessel containing the monomer solution, knocking it from outside, replacing the atmosphere in the vessel with nitrogen gas, and re-evacuating the vessel. Although 10 pieces of the lens substrate were treated by the identical procedures, surface grafting was not possible on 4 of them, surface grafting was proceeded too far on 6 of them, and in any case, the components' concentrations in the system, and the amount of dissolved oxygen could not be controlled by the prior art process, thus a good product could not be obtained.

EXAMPLE 11

10 g of acrylamide was weighed and dissolved in distilled water to prepare a monomer aqueous solution of 100 ml.

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy) disiloxane 8 wt %, bis(trimethylsiloxy)-γ-methacryloxypropyl silanol 7 wt %, methacrylic acid 10 wt % methyl methacrylate 1 wt %, ethylene glycol dimethacrylate 7 wt %, and 2,2'-azobis(2,4-isobutyronitrile) (only as a polymerization initiator) 0.25 wt %, was prepared.

The lens substrate was installed in a discharging device (distance between electrodes of 6 cm, electric voltage between electrodes of 270 V, and frequency of 60 Hz), and glow discharge treatment was carried out in an argon atmosphere of 0.04 Torr for 5 seconds. After the discharge treatment, the lens substrate was exposed to air, placed in a test tube, and the above mentioned acrylamide monomer aqueous solution was added, then Mohr's salt was added, and it was connected to a vacuum system. The test tube was immersed in water filled in a ultrasonic vibration bath. Then the tube was evacuated with a rotary pump for 1 minute, and ultrasonic waves were applied. After passing a predetermined length of time, the test tube was sealed under the reduced pressure, and it was immersed in a thermostatic bath at 40° C. for 15 minutes, to try to carry out graft polymerization on the surface of the lens substrate. The outputs of the ultrasonic waves, and the lengths of application are shown in Table 9 and Table 10.

As it is clear from Table 9, when the application time of ultrasonic waves was equal to or more than 10 seconds, the surface graft polymerization was possible. When the application time of the ultrasonic waves were less than 10 seconds, the dissolved oxygen in the monomer solution was not fully removed, and the polymerization could not be achieved.

From Table 10, it was found that when the application time of the ultrasonic waves exceeded 10 minutes, the monomer solution was concentrated and a part of or whole surface of the graft treated substrate became cloudy. When the application time was equal to or less than 10 minutes, the condition of the graft treated surface was good.

TABLE 9

| Output Time | 10 watts | 100 watts | 500 watts |
|---|---|---|---|
| 8 seconds | X | X | X |
| 10 seconds | o | o | o |

TABLE 9-continued

| Output Time | 10 watts | 100 watts | 500 watts |
| --- | --- | --- | --- |
| 60 seconds | ○ | ○ | ○ |
| 300 seconds | ○ | ○ | ○ |

○ surface grafting was possible.
X surface grafting was not possible.

TABLE 10

| Output Time | 10 watts | 100 watts | 500 watts |
| --- | --- | --- | --- |
| 8 minutes | ○ | ○ | ○ |
| 10 minutes | ○ | ○ | ○ |
| 11 minutes | X | X | X |
| 20 minutes | X | X | X |

○ surface grafting was possible.
X surface grafting was not possible.

Apart from the above mentioned samples, the lens substrate was also treated by prior art processes which did not employ ultrasonic waves during polymerization, and in which the removal of the oxygen was carried out by repeating 5 times such series of steps as evacuating a vessel containing the monomer solution, knocking it from outside, replacing the atmosphere in the vessel with nitrogen gas, and re-evacuating the vessel. Although 10 pieces of the lens substrate were treated by the identical procedures, surface grafting was not possible on 3 of them, surface grafting proceeded too far on 7 of them, and in any case, the components' concentrations in the system, and the amount of the dissolved oxygen could not be controlled by the prior art process, thus a good product could not be obtained.

EXAMPLE 12

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy) disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) (only as a polymerization initiator) 0.25 wt %, was prepared.

The lens substrate was installed in a space produced by spacers having a thickness 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side. The discharge treated lens substrate was placed in a test tube and then it was treated by procedures which were analogous to those used in Example 11. The results are shown in Tables 11 and 12.

Similar to Example 11, when the ultrasonic wave application time was less than 10 seconds, the dissolved oxygen in the monomer solution was not fully removed, and the surface graft polymerization could not be achieved. On the other hand, when the application time was more than 10 minutes, the surface after the surface graft treatment was found to be cloudy. From Table 11 and Table 12, it was found that the good surface graft condition was obtained, only when the application time was equal to or more than 10 seconds and equal to or less than 10 minutes.

TABLE 11

| Output Time | 10 watts | 100 watts | 500 watts |
| --- | --- | --- | --- |
| 8 seconds | X | X | X |
| 10 seconds | ○ | ○ | ○ |
| 60 seconds | ○ | ○ | ○ |
| 300 seconds | ○ | ○ | ○ |

○ surface grafting was possible.
X surface grafting was not possible.

TABLE 12

| Output Time | 10 watts | 100 watts | 500 watts |
| --- | --- | --- | --- |
| 8 minutes | ○ | ○ | ○ |
| 10 minutes | ○ | ○ | ○ |
| 11 minutes | X | X | X |
| 20 minutes | X | X | X |

○ surface grafting was possible.
X surface grafting was not possible.

Apart from the above mentioned samples, the lens substrate was also treated by prior art processes which did not employ ultrasonic waves during polymerization, and in which the removal of the oxygen was carried out by repeating 5 times such series of steps as evacuating a vessel containing the monomer solution, knocking it from outside, replacing the atmosphere in the vessel with nitrogen gas, and re-evacuating the vessel. Although 10 pieces of the lens substrate were treated by the identical procedures, surface grafting was not possible on 4 of them, surface grafting proceeded too far on 6 of them, and in any case, the components' concentrations in the system, and the amount of the dissolved oxygen could not be controlled by the prior art process, thus a good product could not be obtained.

EXAMPLE 13

3 ml of pure water was put in a test tube having an inner diameter of 18 mm, and it was connected to a vacuum system. While the system was evacuated using an evacuation pump having a displacement of 60 l/min, ultrasonic waves were applied to the test tube. The variation of the amount of the oxygen dissolved in pure water was monitored with time by dissolved oxygen meter. The amount of the dissolved oxygen after t minutes, I(t), changed according to:

$$I(t) = I(0) \exp(-a \times t)$$

and when P, the output of the applied ultrasonic waves, was 100 watts, the time constant a was 5, when P was 200 watts, the time constant a was 8.

EXAMPLE 14

3 ml of pure water was put in a test tube having an inner diameter of 18 mm, and it was connected to a vacuum system. While the system was evacuated using an evacuation pump having a displacement of 60 l/min, the following series of steps were repeated 5 times, in which the test tube was knocked from outside then the atmosphere of the vessel was replaced with nitrogen, and the vessel was re-evacuated. The variation of the amount of the oxygen dissolved in pure water was monitored with time by dissolved oxygen meter. This experiment was repeated 10 times, but the variation of the dissolved oxygen with time was different in each run, and such a function having the time as the variable that was obtained in Example 13 could not be obtained.

EXAMPLE 15

3 ml of 10% acrylamide aqueous solution was put in a test tube having an inner diameter of 18 mm, and it was connected to a vacuum system. While the system was evacuated using an evacuation pump having a displacement of 60 1/min, ultrasonic waves were applied to the test tube. The variation of the concentration of acrylamide in the aqueous solution was monitored with time. The concentration of acrylamide after t minutes (t<5), C(t), changed according to;

$$c(t) = C(0)(1 - 0.6 \times t)(\%)$$

wherein, C(0)=10.

EXAMPLE 16

3 ml of 10% acrylamide aqueous solution was put in a test tube having an inner diameter of 18 mm, and it was connected to a vacuum system. While the system was evacuated using an evacuation pump having a displacement of 60 1/min, the following series of steps were repeated 5 times, in which the test tube was knocked from outside then the atmosphere of the vessel was replaced with nitrogen, and the vessel was re-evacuated. The variation of the acrylamide concentration in the solution was monitored with time. This experiment was repeated 10 times, but the variation of the acrylamide concentration with time was different in each run, and such a function having the time as the variable that was obtained in Example 15 could not be obtained.

EXAMPLE 17

A fluorine containing type contact lens substrate which was made of a copolymer of γ-methacryloxypropyltris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy) disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) (only as a polymerization initiator) 0.25 wt %, was prepared. The lens substrate was installed in a space produced by spacers having 1.5 mm, between electrodes of a corona discharge treatment apparatus in which the distance between electrodes was 3.5 cm, the electric voltage between electrodes was 15 kV, the frequency of 60 Hz, and discharge treatment was carried out. The discharge treatment was carried out on both surfaces of the lens, one side by one side for 40 seconds on each side.

35 g of acrylamide and 5 g of N,N'-methylenebisacrylamide were dissolved in 40 g of pure water. Hereinafter it is called a monomer aqueous solution. 1.568 g of ferrous ammonium sulfate hexahydrate (Mohr's salt) was dissolved in 10 g of pure water. Hereinafter it is called a Mohr's salt aqueous solution. 2.4 ml of the monomer aqueous solution, 0.3 ml of the Mohr's aqueous solution and 0.3 ml of pure water were put in a test tube and stirred. The discharge treated lens substrate was put in it and the tube was sealed under reduced pressure. The test tube was put in a thermostatic chamber at 35° C., and the shortest time required for graft polymerization of the monomers on the lens surface was examined. The polymerization time was 7 minutes. Similarly, the shortest polymerization time required for discharge treated fumarate type substrate, siloxanyl methacrylate (which does not contain fluorine) type substrate and methacrylate (which does not contain silicon nor fluorine) type substrate was measured. They were respectively 20 minutes, 50 minutes and 60 minutes.

The transmittance of each substrate at the wave length of 500 nm prior to the discharge treatment and that immediately after the surface graft polymerization treatment with the shortest polymerization time were measured. The results are shown in Table 13. As it is clear from these data, the fluorine containing type substrate and fumarate type substrate showed almost no change in the transmittance before and after the surface graft treatment, and especially the transmittance of the fluorine containing type substrate did not change at all. On the other hand, siloxanyl methacrylate (which does not contain fluorine) type substrate, methacrylate (which does not contain silicon nor fluorine) type substrate showed discoloration of a high degree.

As mentioned above, it is obvious that the fluorine containing substrate has the superiority since it requires a short time for the polymerization treatment. The fumarate type substrate showed a good effect that it is hard to be discolored, though it is inferior to the fluorine containing type substrate.

TABLE 13

| Substrate | Transmittance prior to discharge treatment (500 nm) | Transmittance after graft polymerization treatment (500 nm) |
| --- | --- | --- |
| fluorine containing type | 92% | 92% |
| fumarate type | 92% | 90% |
| siloxanyl methacrylate type | 92% | 76% |
| methacrylate type | 92% | 68% |

EXAMPLE 18

A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(-trimethylsiloxy)disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was processed into a lens shape having a diameter of about 8 mm, and a thickness of about 0.1 mm) by cutting and polishing process.

Acrylamide and N,N'-methylenebisacrylamide were dissolved in water to prepare a monomer aqueous solution. 6 kinds of aqueous solutions having different ratios of components by weight as shown in Table 1 were prepared. 3.0 ml of each aqueous solution was taken in a test tube and the whole lens substrate was immersed in it. After replacing the atmosphere with nitrogen gas, the tube was sealed under reduced pressure. The test tube was put in a thermostatic chamber at 80° C. for 60 minutes, and the monomer was graft polymerized on the surface of the lens substrate (Table 14, Sample No. 1-6).

To compare with a prior art process, some samples were prepared using a 40 wt % acrylamide monomer aqueous solution in which the cross-linking agent was not added (Table 14, comparative Example No. 1-6).

The polymerization condition employed was identical with that used for the sample No. 1-6 of Table 14.

Visible light transmission of the graft treated lens at 480 nm was measured to evaluate the degree of cloudiness of the lens. The results are shown in Table 14.

TABLE 14

| | Component ratio wt % AAm:MBAAm:H2O* | Transmittance (480 nm) % |
|---|---|---|
| Sample No. | | |
| 1 | 35.0:2.0:63.0 | 90.8 |
| 2 | 35.0:4.0:61.0 | 90.5 |
| 3 | 35.0:5.0:60.0 | 91.8 |
| 4 | 35.0:10.0:55.0 | 91.7 |
| 5 | 35.0:12.0:53.0 | 20.3 |
| 6 | 35.0:14.0:51.0 | 20.5 |
| Comparative Example No. | | |
| 1 | 40.0:0.0:60.0 | 90.8 |
| 2 | 40.0:0.0:60.0 | 90.5 |
| 3 | 40.0:0.0:60.0 | 90.7 |
| 4 | 40.0:0.0:60.0 | 90.6 |
| 5 | 40.0:0.0:60.0 | 90.6 |
| 6 | 40.0:0.0:60.0 | 90.6 |

*AAm: acrylamide
MBAAm: N,N'-methylenebisacrylamide

Then each of the clear lenses having high transmittance (the same substrate as those shown in Sample No. 1-4 in the Table 14), was subjected to the following test to check the rubbing resistance.

First of all, the lens was washed by rubbing with hands smeared with a detergent 1000 times (forward and backward). Then the contact angle of the lens surface after the rubbing was measured, and the difference between it and the contact angle measured and recorded before the rubbing was used to evaluate the degree of the graft polymer's removal.

For comparison, products (the same substrates as those shown as Comparative Example No. 1-6 in the Table 14) obtained by graft treatment using a 40 wt % acrylamide aqueous solution system in which no cross-linking agent was added, were treated with the same procedure used for the sample No. 1-4 in Table 15.

The measurement of the contact angle was carried out by the sessile drop method, and water was used as a solvent. The results are shown in Table 15.

TABLE 15

| | Contact angle θ before rubbing | Contact angle θ after rubbing | Contact angle change |
|---|---|---|---|
| Sample No. | | | |
| 1 | 54 | 57 | 3 |
| 2 | 53 | 55 | 2 |
| 3 | 58 | 58 | 0 |
| 4 | 55 | 54 | 1 |
| Comparative Example 1 | | | |
| 1 | 56 | 88 | 32 |
| 2 | 58 | 85 | 27 |
| 3 | 59 | 85 | 26 |
| 4 | 55 | 86 | 31 |
| 5 | 53 | 89 | 36 |
| 6 | 55 | 91 | 36 |

*Contact angle θ/deg

EXAMPLE 19

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy)disiloxane 7 wt %, methacrylic acid 11 wt %, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a space produced by spacers having a thickness of 1.5 mm, between electrodes of a corona discharge treatment apparatus in which the electrode diameter was 70 mm, electric voltage between electrodes was 15 kV, the frequency was 60 Hz, and discharge treatment was carried out. The discharge treatment was carried out on both surfaces of the lens, one side by one side for 40 seconds on each side.

Then monomer aqueous solutions having different ratios of components were prepared in the same manner as described in Example 18, and 3.0 ml of each aqueous solution was put in a test tube, and 0.047 g of Mohr's salt (ferrous ammonium sulfate) was added as a redox catalyst to each solution, and stirred and dissolved. The lens substrate after discharge treatment was put in it and after replacing the atmosphere with nitrogen gas, the tube was sealed under reduced pressure. The test tube was put in a thermostatic chamber at 35° C. for 20 minutes, and the monomer was graft polymerized on the lens substrate surface (Sample No. 1-6 in Table 16).

For comparison, some samples were produced by using a 40 wt % acrylamide monomer aqueous solution in which no cross-linking agent was added (Comparative Example No. 1-6 in Table 16). The polymerization condition employed for them was identical with that used for the Sample No. 1-6 of Table 16.

Visible light transmission of the graft tested lens at 480 nm was measured and cloudiness of the lens was evaluated. The results are shown in Table 16.

TABLE 16

| | Component ratio wt % AAm:MBAAm:H2O* | Transmittance (480 nm) % |
|---|---|---|
| Sample No. | | |
| 1 | 35.0:2.0:63.0 | 90.6 |
| 2 | 35.0:4.0:61.0 | 90.5 |
| 3 | 35.0:5.0:60.0 | 92.0 |
| 4 | 35.0:10.0:55.0 | 91.8 |
| 5 | 35.0:12.0:53.0 | 20.9 |
| 6 | 35.0:14.0:51.0 | 20.7 |
| Comparative Example No. 1 | | |
| 1 | 40.0:0.0:60.0 | 90.4 |
| 2 | 40.0:0.0:60.0 | 90.8 |
| 3 | 40.0:0.0:60.0 | 91.5 |
| 4 | 40.0:0.0:60.0 | 90.5 |
| 5 | 40.0:0.0:60.0 | 90.7 |
| 6 | 40.0:0.0:60.0 | 90.3 |

*AAm: acrylamide
MBAAm: N,N'-methylenebisacrylamide

Then each of clear lenses having high transmittance (the same substrate as those shown in Sample No. 1-4 in Table 16), was subjected to the following test to check the rubbing resistance.

First of all, the lens was washed by rubbing with hands smeared with a detergent 1000 times (forward and backward). Then, the contact angle of the lens surface after the rubbing was measured, and the difference between it and the contact angle measured and recorded before the rubbing was used to evaluate the degree of the graft polymer's removal.

For comparison, products (the same substrates as those shown as Comparative Examples No. 1-6 in Table 16) obtained by graft treatment using a 40 wt % acrylamide aqueous solution system in which no cross-linking agent was added, were treated with the same procedure used for the sample No. 1–4 in Table 17.

The measurement of the contact angle was carried out by to sessile drop method, and water was used as a solvent. The results are shown in Table 17.

TABLE 17

| | Contact angle θ before rubbing | Contact angle θ after rubbing | Contact angle change |
|---|---|---|---|
| Sample No. | | | |
| 1 | 56 | 58 | 2 |
| 2 | 57 | 58 | 1 |
| 3 | 56 | 58 | 2 |
| 4 | 53 | 58 | 5 |
| Comparative Example No. | | | |
| 1 | 58 | 90 | 32 |
| 2 | 54 | 86 | 32 |
| 3 | 57 | 85 | 28 |
| 4 | 55 | 83 | 28 |
| 5 | 58 | 85 | 27 |
| 6 | 58 | 84 | 26 |

Contact angle θ/deg

As it is clear from Table 14 and Table 16, a product obtained with a polymerization solution comprising acrylamide, N,N'-methylenebisacrylamide was equal to or less than 10 wt % (Sample No. 1–4 in Table 14 and Table 16) showed high visible light transmission and the lens surface was not cloudy. The value of the transmittance was not lower than those products produced by polymerization using a 40 wt % acrylamide aqueous solution system (Comparative Example No. 1–6 in Table 14 and Table 16), and it had satisfactory clarity as a contact lens. Those produced by the solution in which N,N'-methylenebisacrylamide content was over 10 wt % (Sample No. 5 and 6 in Table 14 and Table 16) showed cloudy lens surface, and the transmittance was very much decreased.

As it is clear from Table 15 and Table 17, the increase in the contact angle after the rubbing was greatly suppressed in the products in which the cross-linking agent was added (Sample No. 1–4 in Table 15 and Table 17), and the water wettability on the lens surface was retained. This result shows that by adding the cross-linking agent to the hydrophilic monomer aqueous solution, the acrylamide graft polymer was cross-linked with N,N'-methylenebisacrylamide, and the bonding strength between the lens substrate and the graft polymer was increased, and the rubbing resistance of the graft lens surface was improved. The graft contact lens which is not cloudy and which is obtained by the solution in which the amount of the cross-linking agent added was equal to or less than 10 wt %, also showed sufficiently high durability, and it was confirmed that they generate no problems on practical use.

As described above, a graft contact lens which had good durability and whose surface was not cloudy was produced.

EXAMPLE 20

Ten g of acrylamide and 0.266 g of N,N'-methylenebisacrylamide (as a cross-linking agent were dissolved in 100 ml of water to prepare a monomer aqueous solution.

The graft polymerization was carried out as follows. A contact lens substrate which was made of a copolymer of θ-methacryloxypropyl-tris(trimethylsiloxy) silane 48 wt %, 2,2,2-trifluoroethyl methacrylate 19 wt %, 1,3-bis(θ-methacryloxypropyl)-1,1,3,3-tetrakis(trimethylsiloxy)disiloxane 8 wt %, bis(trimethylsiloxy)-θ-methacryloxypropyl silanol 7 wt %, methacrylic acid 10 wt %, methyl methacrylate 1 wt %, ethylene glycol dimethacrylate 7 wt %, and 2,2'-axobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while.

3 ml of the above-mentioned cross-linking agent added acrylamide monomer aqueous solution was added to a test tube, and the lens substrate after discharge treatment was put in it and after the whole substrate was assured to be immersed in the solution, the atmosphere was replaced with nitrogen and the tube was sealed under reduced pressure. The test tube was placed in a thermostatic bath at 80° C. for 60 minutes, and acrylamide was graft polymerized on the lens substrate surface.

Then 5 g of acrylic acid, 0.133 g of N,N'-methylenebisacrylamide (as a cross-linking agent) and 40 ml of ammonium persulfate (as a polymerization initiator) were dissolved in water of 100 ml, and the contact lens with the graft treated surface was put in it, and after sufficiently swelling the graft polymer, it was heated at 60° C. to carry out the polymerization of acrylic acid (Sample No. 1–6 in Table 18).

To compare with prior art process, some samples were prepared by carrying out only graft polymerization and without carrying out the acrylic acid polymerization (Comparative Examples 1–6 in Table 18). The polymerization condition employed was identical with that used for the above mentioned samples.

The lens after the treatment was washed by rubbing with hands smeared with a detergent 1000 times (forward and backward) to carry out rubbing resistance test. To evaluate the degree of the graft polymer's removal, the change of the contact angle of the lens surface before and after the rubbing was examined. The measurement of the contact angle was carried out by the sessile drop method, and water was used as a solvent. The results are shown in Table 18.

TABLE 18

| | Contact angle θ before rubbing | Contact angle θ after rubbing | Contact angle change |
|---|---|---|---|
| Sample No. | | | |
| 1 | 52 | 64 | 12 |
| 2 | 50 | 65 | 15 |
| 3 | 50 | 62 | 12 |
| 4 | 53 | 62 | 9 |
| 5 | 54 | 63 | 9 |
| 6 | 50 | 55 | 5 |
| Comparative Example | | | |
| 1 | 58 | 89 | 31 |
| 2 | 55 | 83 | 28 |
| 3 | 56 | 88 | 32 |
| 4 | 53 | 89 | 36 |
| 5 | 58 | 90 | 32 |

TABLE 18-continued

| | Contact angle θ before rubbing | Contact angle θ after rubbing | Contact angle change |
|---|---|---|---|
| 6 | 58 | 91 | 33 |

Contact angle θ/deg

EXAMPLE 21

A contact lens substrate which was made of a copolymer of γ-methacrylooxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy)disiloxane 7 wt %, bis(trimethylsiloxy)-γ-methacryloxypropyl silanol 8 wt %, methacrylic acid 11 wt %, ethylene glycol dimethacrylate 7 wt %, and 2 2'-azobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a space produced by spacers having a thickness of 1.5 mm, between electrodes of a corona discharge treatment apparatus in which the distance between electrodes was 10 mm, electric voltage between electrodes was 15 kV, and the frequency was 60 Hz, and discharge treatment was carried out. The discharge treatment was carried out on both surfaces of the lens, one side by one side for 40 seconds on each side.

2.7 ml of a cross-linking agent added acrylamide monomer aqueous solution (10 g of acrylamide and 0.266 g of N,N'-methylenebisacrylamide in 100 ml of water) which was the same solution used in Example 3, was added to a test tube. Then, 0.3 ml of a solution in which 0.158 g of ferrous ammonium sulfate (Mohr's salt) was dissolved in water of 10 ml was poured into the test tube as a redox catalyst.

Then the lens substrate after discharge treatment was put in a test tube so that the whole substrate was immersed in the solution, and replacement with nitrogen was carried out and the tube was sealed under reduced pressure. The test tube was put in a thermostatic bath at 35° C. for 60 minutes, then acrylamide was graft polymerized on the lens substrate surface.

Then 5 g of acrylic acid, 0.133 g of N,N'-methylenebisacrylamide (as a cross-linking agent) and 40 ml of ammonium persulfate (as a polymerization initiator) were dissolved in water of 100 ml, and the contact lens with the graft treated surface was put in it, and after sufficiently swelling the graft polymer, it was heated at 60° C. to carry out the polymerization of acrylic acid (Sample No. 1-6 in Table 19).

To compare with prior art process, some samples were prepared by carrying out only graft polymerization and without carrying out the acrylic acid polymerization (Comparative Examples 1-6 in Table 19). The polymerization condition employed was identical with that used for the above mentioned samples.

The lens after the treatment was washed by rubbing with hands smeared with a detergent 1000 times (forward and backward) to carry out rubbing resistance test. To evaluate the degree of the graft polymer's removal, the change of the contact angle of the lens surface before and after the rubbing was examined. The measurement of the contact angle was carried out by the sessile drop method, and water was used as a solvent. The results are shown in Table 19.

TABLE 19

| | Contact angle θ before rubbing | Contact angle θ after rubbing | Contact angle change |
|---|---|---|---|
| Sample No. | | | |
| 1 | 58 | 61 | 3 |
| 2 | 56 | 60 | 4 |
| 3 | 53 | 66 | 13 |
| 4 | 53 | 64 | 11 |
| 5 | 53 | 62 | 9 |
| 6 | 55 | 60 | 5 |
| Comparative Example | | | |
| 1 | 58 | 90 | 32 |
| 2 | 55 | 88 | 33 |
| 3 | 55 | 86 | 31 |
| 4 | 54 | 82 | 28 |
| 5 | 56 | 89 | 33 |
| 6 | 59 | 87 | 28 |

*Contact angle θ/deg

As it is clear from Table 5 and Table 6, the increase of the contact angle after rubbing was greatly inhibited by introduction of acrylic acid polymerization process, and the water wettability on the lens surface was retained. This phenomenon can be explained as follows. When polyacrylic acid is tangled with acrylamide polymer molecular chains introduced on the surface of the contact lens to form a network structure, hydrogen bonds are generated between the amide group of the polyacrylamide and the carboxyl group of the polyacrylic acid and pseudo-cross-linking of the graft polymer chains is generated (see the following scheme), and the stress of the rubbing applied to one graft polymer chain is dispersed, and the bonding strength between the lens substrate and the graft polymer is increased to improve the rubbing resistance of the graft treated lens surface.

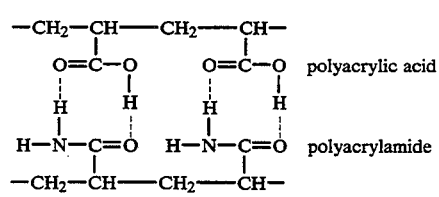

EXAMPLE 22

35 g of acrylamide and 5 g of N,N'-methylenebisacrylamide (as a cross-linking agent) were dissolved in 60 g of water to prepare a monomer aqueous solution.

The graft polymerization was carried out as follows. A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(-trimethylsiloxy)disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while. The lens substrate after the discharge treatment was then put in a test tube and 3 ml of the above mentioned monomer aqueous solution was added to it. It was connected to a vacuum system, and the air in the tube was aspirated, then sealing of the tube was carried out under vacuum condition. The test tube was inserted into water bath shaker (EP-1, produced by Taitec Corporation) and graft polymerization on the substrate surface was carried out by shaking it under thermostatic condition at 80° C. for 60 minutes. After the polymerization was completed, the treated surface was examined using an optical microscope to see if there was any cloudy area. The shaking conditions of the water bath shaker (shaking cycle and amplitude) were set as in Table 20, and 6 samples (Sample No. 1–6 in Table 20) were examined.

For comparison, some samples treated by prior art surface graft polymerization without being shaken (Comparative Examples No. 1–6 in Table 20) were examined as well.

As it is clear from Table 20, all the samples shaken during the graft polymerization (Sample No. 1–6 in Table 20) showed good surface condition and no cloudiness or the like. On the other hand, observation by optical microscope showed that there was a cloudy area on a part of or the whole surface of those which were not shaken during polymerization.

From the above mentioned results, it becomes clear that the shaking of the monomer solution during the graft polymerization assures homogeneity of the concentration, which has a very big effect on improving the surface graft condition.

TABLE 20

| | Shaking cycle (cycle) | Amplitude (MM) | Graft surface condition |
|---|---|---|---|
| Sample No. | | | |
| 1 | 40 | 30 | ○ |
| 2 | 80 | 30 | ○ |
| 3 | 120 | 30 | ○ |
| 4 | 160 | 30 | ○ |
| 5 | 160 | 20 | ○ |
| 6 | 160 | 10 | ○ |
| Comparative Example No. | | | |
| 1 | — | — | X |
| 2 | — | — | X |
| 3 | — | — | X |
| 4 | — | — | X |
| 5 | — | — | X |
| 6 | — | — | X |

○ good surface condition (not cloudy)
X bad surface condition (cloudy)

EXAMPLE 23

35 g of acrylamide and 5 g of N,N'-methylenebisacrylamide (as a cross-linking agent) were dissolved in 60 g of water to prepare a monomer aqueous solution.

The graft polymerization was carried out as follows. A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy)disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) 0.25 wt %, was prepared.

The lens substrate was installed in a space produced by spacers having a thickness of 1.5 mm, between electrodes of a corona discharge treatment apparatus in which the distance between electrodes was 3.5 cm, electric voltage between electrodes was 15 kV, the frequency was 60 Hz, and discharge treatment was carried out. The discharge treatment was carried out on both surfaces of the lens, one side by one side for 40 seconds on each side. The lens substrate after the discharge treatment was then put in a test tube and such an amount of the above mentioned monomer aqueous solution was added to it that the lens substrate could be well immersed. It was connected to a vacuum system, and the air in the tube was aspirated, then sealing of the tube was carried out under vacuum condition. The test tube was inserted into a water bath shaker (EP-1, produced by Taitec Corporation) and graft polymerization on the substrate surface was carried out by shaking it under thermostatic condition at 80° C. for 60 minutes. After the polymerization was completed, the treated surface was examined using an optical microscope to see if there was any cloudy area. The shaking conditions of the water bath shaker (shaking cycle and amplitude) were set as in Table 21, and 6 samples (Sample No. 1–6 in Table 21) were examined.

For comparison, some samples treated by prior art surface graft polymerization without being shaken (Comparative Examples No. 1–6 in Table 21) were examined as well.

As it is clear from Table 21, all the samples shaken during the graft polymerization (Sample No. 1–6 in Table 21) showed good surface condition and no cloudiness or the like. While, observation by optical microscope showed that there was a cloudy area on a part of or the whole surface of those which were not shaken during polymerization (Comparative Example No. 1–6 in Table 21).

From the above mentioned results, it becomes clear that the shaking of the monomer solution during the graft polymerization assures homogeneity of the concentration, which has a very big effect on improving the surface graft condition.

TABLE 21

| | Shaking Cycle (cycle) | Amplitude (mm) | Graft surface condition |
|---|---|---|---|
| Sample No. | | | |
| 1 | 40 | 30 | ○ |
| 2 | 80 | 30 | ○ |
| 3 | 120 | 30 | ○ |
| 4 | 160 | 30 | ○ |
| 5 | 160 | 20 | ○ |
| 6 | 160 | 10 | ○ |
| Comparative Example No. | | | |
| 1 | — | — | X |
| 2 | — | — | X |
| 3 | — | — | X |
| 4 | — | — | X |
| 5 | — | — | X |
| 6 | — | — | X |

○ good surface condition (not cloudy).
X bad surface condition (cloudy).

EXAMPLE 24

35 g of acrylamide and 5 g of N,N'-methylenebisacrylamide (as a cross-linking agent) were dissolved in 60 g of water to prepare a monomer aqueous solution.

The graft polymerization was carried out as follows. A contact lens substrate which was made of a copolymer of γ-methacrytoxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy)disiloxane-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while.

3 ml of the above mentioned cross-linking agent added monomer aqueous solution was put in a glass polymerization vessel, and a silicon rubber protection jig 1 (in which the contact lens substrate 2 was fixed as it is shown in the FIG. 1) was inserted into it and after the whole substrate was assured to be immersed in the solution, the atmosphere was replaced with nitrogen and the tube was sealed under reduced pressure. The test tube was placed in a thermostatic bath at 80° C. for 30 minutes, and acrylamide was graft polymerized on the lens substrate surface. 6 samples (Sample No. 1–6 in Table 22) were prepared by identical procedures.

For comparing with prior art process, several samples were graft polymerized in a glass polymerization vessel without being fixed on the protection jig 1 (Comparative Example No. 1–6 in Table 22). The discharging condition, the polymerization temperature and the polymerization time were identical with those used for preparing the samples fixed on the projection jig 1 (Sample No. 1–6 in Table 22).

The contact lens after completing the graft treatment was observed by optical microscope to find out if there was any crack in the edge and if the surface was scratched or not, the results are shown in Table 22.

TABLE 22

| Sample No. | Crack in the edge | Amplitude |
|---|---|---|
| 1 | o | o |
| 2 | o | o |
| 3 | o | o |
| 4 | o | o |
| 5 | o | o |
| 6 | o | o |
| Comparative Example No. | | |
| 1 | o | X |
| 2 | o | X |
| 3 | X | X |
| 4 | X | X |
| 5 | o | X |
| 6 | X | X | o: no scratch, crack nor deformation.
X: scratch, crack or deformation exists.

EXAMPLE 25

A contact lens substrate which was made of a copolymer of γ-methacryloxypropyl-tris(trimethylsiloxy) silane 48 wt %, 1,1-dihydroperfluorobutyl methacrylate 19 wt %, 1,3-bis(γ-methacryloxypropyl)-1,1,3,3-tetrakis(trimethylsiloxy)disiloxane 7 wt %, bis(trimethylsiloxy)-γ-methacryloxypropyl silanol 8 wt %, methacrylic acid 11 wt %, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, and a thickness of about 0.1 mm) by cutting and polishing process.

The lens substrate was installed in a space produced by spacers having a thickness of 1.5 mm, between electrodes of a corona discharge treatment apparatus in which the electrode diameter was 70 mm, electric voltage between electrodes was 15 kV, the frequency was 60 Hz, and discharge treatment was carried out. The discharge treatment was carried out on both surfaces of the lens, one side by one side for 40 seconds on each side.

Figure 2:
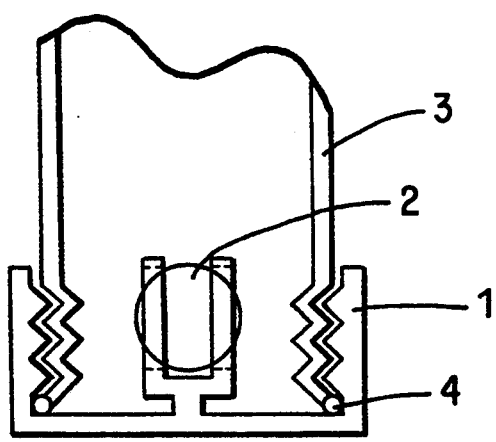
FIG. 2 is a sectional view of a fixed type protection jig of the present invention and each number shows the following article:
1. Protection jig
2. Contact lens substrate
3. Polymerization vessel
4. O-ring

The contact lens substrate after the discharge treatment was placed in a silicon rubber fixed type protection jig 1 (in which a bottom cover and a substrate fixing apparatus were made into one body) as it is shown in the FIG. 2, then the jig was screwed and fixed on the glass polymerization vessel 3. 2.7 ml of a monomer aqueous solution prepared by dissolving 35 g of acrylamide and 5 g of N,N'-methylenebisacrylamide (as a cross-linking agent) in 50 g of water was put in the polymerization vessel. Then 0.3 ml of a solution in which 1.568 g of ferrous ammonium sulfate (Mohr's salt) was dissolved in water of 10 g, was poured into it so that the whole substrate was immersed in the solution, then the tube was sealed under reduced pressure. The test tube was placed in a thermostatic bath at 35° C. for 50 minutes, and acrylamide was graft polymerized on the lens substrate surface. 6 samples (Sample No. 1–6 in Table 23) were prepared by identical procedures.

For comparing with prior art process, several samples were graft polymerized in a glass polymerization vessel without being fixed on the protection jig 1 (Comparative Example No. 1–6 in Table 23). The discharging condition, the polymerization temperature and the polymerization time were identical with those used for preparing the samples fixed on the protection jig 1 (Sample No. 1–6 in Table 23).

The contact lens after completing the graft treatment was observed by optical microscope to find out if there was any crack in the edge and if the surface was scratched or not. The results are shown in Table 23.

TABLE 23

| Sample No. | Crack in the edge | Surface scratch |
|---|---|---|
| 1 | o | o |
| 2 | o | o |
| 3 | o | o |
| 4 | o | o |
| 5 | o | o |
| 6 | o | o |
| Comparative Example No. | | |
| 1 | X | X |
| 2 | o | X |
| 3 | X | X |
| 4 | X | X |
| 5 | X | X |
| 6 | X | X | o: no scratch, crack nor deformation.
X: scratch, crack or deformation exists.

As it is clear from Table 22 and Table 23, with the prior art process, i.e. without using the protection jig, the crack in the edge and surface scratch could not be completely prevented. On the other hand, when the projection jig of the present invention was used to fix the lens material, no crack was found in the edge and the surface was not scratched at all.

EXAMPLE 26

35 g of acrylamide and 5 g of N,N'-methylenebisacrylamide (as a cross-linking agent) were dissolved in 60 g of water to prepare a monomer aqueous solution.

The graft polymerization was carried out as follows. A contact lens substrate which was made of a polymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy)disiloxane 8 wt %, bis(trimethylsiloxy)-γ-methacryloxypropyl silanol 7 wt %, methacrylic acid 10 wt %, methyl methacrylate 1 ww5%, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, a thickness of about 0.1 mm and Vickers hardness of about 8.0) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while.

3 ml of the above mentioned cross-linking agent added acrylamide monomer aqueous solution was added to a glass polymerization vessel, and a protection jig 1 made of silicon rubber (having Vickers hardness of about 5.5) in which the contact lens substrate 2 was fixed as it is shown in the FIG. 1 was inserted into it, and after the whole substrate was assured to be immersed in the solution, the atmosphere was replaced with nitrogen and the tube was sealed under reduced pressure. The test tube was placed in a thermostatic bath at 80° C. for 30 minutes, and acrylamide was graft polymerized on the surface of the lens substrate. 6 samples (Sample No. 1-6 in Table 23) were prepared by identical procedures.

For comparing with prior art process, several samples were graft polymerized in a glass polymerization vessel being fixed on a protection jig 1 which was made of a copolymer having dimethacrylate of bisphenol A bromide and styrene as main components (having Vickers hardness of about 20) (Comparative Example No. 1-6 in Table 24). The discharging condition, the polymerization temperature and the polymerization time were identical with those used for preparing the Samples fixed on the protection jig 1 made of silicon rubber (Sample No. 1-6 in Table 24).

The contact lens after completing the graft treatment was observed by optical microscope to find out if there was any crack in the edge and if the surface was scratched or not. The results are shown in Table 24.

TABLE 24

| | Crack in the edge | Surface scratch |
|---|---|---|
| Sample No. | | |
| 1 | o | o |
| 2 | o | o |
| 3 | o | o |
| 4 | o | o |
| 5 | o | o |
| 6 | o | o |
| Comparative Example No. | | |
| 1 | X | X |

TABLE 24-continued

| | Crack in the edge | Surface scratch |
|---|---|---|
| 2 | o | X |
| 3 | X | X |
| 4 | o | X |
| 5 | X | X |
| 6 | o | X | o: no scratch, crack nor deformation.
X: scratch, crack or deformation exists.

As it is clear from Table 24, when a protection jig having a bigger Vickers hardness than that of the lens substrate was used, the crack in the edge, and the surface damage could not be completely prevented. Meanwhile, the lens substrate installed in the protection jig made of silicon rubber having a small Vickers hardness thus which was a softer material than the lens substrate showed no crack in the edge and its surface was not scratched at all.

EXAMPLE 27

A contact lens substrate which was made of a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(-trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, was processed into a lens shape (having a diameter of about 8 mm, and a thickness of about 0.1 mm) by cutting and polishing process. Hereinafter it is called as CL1.

Another contact lens substrate which was made of a copolymer of methyl methacrylate 60 wt %, tris(trimethylsiloxy) sililpropyl methacrylate 35 wt %, and 2-hydroxy ethyl methacrylate 5 wt %, was processed into a lens shape (having a diameter of about 8 mm, and a thickness of about 0.1 mm) by cutting and polishing process. Hereinafter it is called the CL2.

CL1 was installed in a space produced by spacers having 1.5 mm, between electrodes of a corona discharge treatment apparatus in which the electrode diameter was 70 mm, electric voltage between electrodes was 15 kV, the frequency of 60 Hz, and discharge treatment was carried out. The discharge treatment was carried out on both surfaces of the lens, one side by one side for 40 seconds on each side.

The contact lens substrate after discharge treatment was put in a test tube and 2.7 ml of a monomer aqueous solution prepared by dissolving 35 g of acrylamide and 5 g of N,N'-methylenebisacrylamide (as a cross-linking agent) in 50 g of water was put in the test tube. Then 0.3 ml of a solution in which 1.568 g of ferrous ammonium sulfate (Mohr's salt) was dissolved in water of 10 g, was poured into it, as a redox catalyst, and after the whole substrate was assured to be immersed in the solution, the tube was sealed under reduced pressure. The test tube was placed in a thermostatic bath at 35° C., and acrylamide was graft polymerized on the lens substrate surface. The polymerization time is shown in the Table 25 for Sample No. 1-6.

Then the surface wettability of the lens after the graft polymerization was evaluated by measuring the contact angle. The measurement of the contact angle was carried out by sessile drop method, and water was used as a solvent.

To compare with prior art process, some samples were produced from CL2 by similar procedures (Comparative examples No. 1–6 in Table 25). The polymerization time was changed in the same way as that for Sample No. 1–6 in Table 25.

TABLE 25

| | Polymerization time (min) | Contact angle (deg.) | Successful graft or not |
|---|---|---|---|
| Sample No. | | | |
| 1 | 1 | 90 | X |
| 2 | 3 | 88 | X |
| 3 | 5 | 75 | X |
| 4 | 10 | 15 | o |
| 5 | 30 | 17 | o |
| 6 | 60 | 12 | o |
| Comparative Example No. | | | |
| 1 | 1 | 90 | X |
| 2 | 3 | 85 | X |
| 3 | 5 | 92 | X |
| 4 | 10 | 88 | X |
| 5 | 30 | 89 | X |
| 6 | 60 | 14 | o | o good surface condition (not cloudy).
X bad surface condition (cloudy).

As it is clear from Table 25, CL2 requires a longer time than CL1 for completion of graft. According, CL1, that is a lens substrate containing fluoroalkyl methacrylate was found to be very advantageous since it requires a smaller production cost than the prior art siloxanyl methacrylate type lens substrate.

EXAMPLE 28

A contact lens substrate which was made of a copolymer of alkyl fumarate, siloxanyl fumarate, fluoroalkyl fumarate, and methyl methacrylate was processed into a lens shape (having a diameter of about 8 mm, and a thickness of about 0.1 mm) by cutting and polishing process. Hereinafter it is called as CL3.

A siloxanyl methacrylate type lens substrate which was the same as that used in Example 27 was prepared as CL2.

CL3 was installed in a space produced by spacers having a thickness of 1.5 mm, between electrodes of a corona discharge treatment apparatus in which the electrode diameter was 70 mm, electric voltage between electrodes was 15 kV, the frequency was 60 Hz, and discharge treatment was carried out. The discharge treatment was carried out on both surfaces of the lens, one side by one side for 40 seconds on each side.

The contact lens substrate after discharge treatment was put in a test tube and 2.7 ml of a monomer aqueous solution prepared by dissolving 35 g of acrylamide and 5 g of N,N'-methylenebisacrylamide (as a cross-linking agent) in 50 g of water was put in the test tube. Then 0.3 ml of a solution is which 1.568 g of ferrous ammonium sulfate (Mohr's salt) was dissolved in water of 10 g, was poured into it, as a redox catalyst, and after the whole substrate was assured to be immersed in the solution, the tube was sealed under reduced pressure. The test tube was placed in a thermostatic bath at 35° C., and acrylamide was graft polymerized on the lens substrate surface. The polymerization time is shown in the Table 26 for Sample No. 1–6.

Then the surface wettability of the lens after the graft polymerization was evaluated by measuring the contact angle. The measurement of the contact angle was carried out by the sessile drop method, and water was used as a solvent.

To compare with prior art process, some samples were produced from CL2 by similar procedures (Comparative examples No. 1–6 in Table 26). The polymerization time was changed in the same way as that for Sample No. 1–6 in Table 26. The results are shown in Table 26.

TABLE 26

| | Polymerization time (min) | Contact angle (deg.) | Successful graft or not |
|---|---|---|---|
| Sample No. | | | |
| 1 | 1 | 92 | X |
| 2 | 3 | 89 | X |
| 3 | 5 | 85 | X |
| 4 | 10 | 84 | X |
| 5 | 30 | is | o |
| 6 | 60 | 13 | o |
| Comparative Example No. | | | |
| 1 | 1 | 93 | X |
| 2 | 3 | 95 | X |
| 3 | 5 | 95 | X |
| 4 | 10 | 87 | X |
| 5 | 30 | 92 | X |
| 6 | 60 | 16 | o | o good surface condition (not cloudy).
X bad surface condition (cloudy).

As is clear from Table 26, CL2 requires a longer time for completion of graft than CL3. Accordingly, CL3, that is a lens substrate of fumarate type was found to be very advantageous since it requires a smaller production cost than the prior art siloxanyl methacrylate type lens substrate.

As described above, in accordance with the present invention, by adding a cross-linking agent such as N,N'-methylenebisacrylamide to a polymerization system made of a hydrophilic monomer aqueous solution such as acrylamide, the resulted graft polymer had a cross-linked structure, its bonding strength with the lens substrate was increased and the rubbing resistance was improved very much. This has an advantage that the water wettability of the contact lens can be kept for a long time. By limiting the amount of the N,N'-methylenebisacrylamide to be added as it is written in the claims, in addition to the improvement of the rubbing resistance of the graft chain and the maintenance of the high wettability for a long time, the surface was not made cloudy and the intrinsic optical characteristics of the lens were not deteriorated.

By entangling polyacrylic acid and the like with the polymer chains of a hydrophilic polymer such as acrylamide which is grated on the surface of the contact lens, a network structure is generated and the polymer chains provide hydrogen bonds between them, so that the resulted graft polymer shows increased bonding strength with the lens substrate as well as very much improved rubbing resistance. This has an advantage that the water wettability of the contact lens can be kept for a long time.

Furthermore, shaking of the system during the graft polymerization was found to be very effective for making good surface graft condition, since the concentration homogeneity of the monomer solution can be assured by that.

In addition to that, the protection jig contributes very much to improve the yields since it can prevent the contact lens substrate from colliding with the inner wall of the polymerization vessel during deaeration or polymerization to cause a crack in the edge part or to scratch the surface. By limiting the material of the protection jig to such a material that has a smaller surface hardness than that of the lens substrate, the surface scratch of the lens during the polymerization can be avoided as much as possible. Accordingly, the present invention is a very effective process from the viewpoint of the protection of the contact lens substrate and accordingly provides great advantages.

Also, it became clear that the lens substrate containing fluoroalkyl methacrylate and the lens substrate of fumarate type are very advantageous from the view point of the production coat, which is lower than that of the prior art siloxanyl methacrylate type lens substrate, since they require a relatively short time for the graft polymerization.

EXAMPLE 29

A contact lens substrate A made of a copolymer A which mainly contains methyl methacrylate (and which does not contain silicon nor fluorine), a contact lens substrate B made of siloxanyl methacrylate type copolymer B (which does not contain fluorine), a contact lens substrate C made of fumarate type copolymer C and a contact lens substrate D made of fluorine containing type copolymer D (which is a copolymer of γ-methacryloxypropyl-tris(trimethylsiloxy) silane 48 wt %, 2,2,2-trifluoroethyl methacrylate 19 wt %, 1,3-bis(γ-methacryloxypropyl)-1,1,3,3-tetrakis(trimethylsiloxy) disiloxane 8 wt %, bis(trimethylsiloxy)-γ-methacryloxypropyl silanol 7 wt %, methacrylic acid 10 wt %, methyl methacrylate 1 wt %, ethylene glycol dimethacrylate 7 wt %, and 2,2'-azobis(2,4-isobutyronitrile) (only as a polymerization initiator) 0.25 wt %, only as a polymerization initiator, were respectively processed into a lens shape (having a diameter of about 8 mm and a thickness of about 0.1 mm) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while then put in a test tube.

2.7 ml of a monomer aqueous solution prepared by dissolving 105 g of acrylamide and 15 g of N,N'-methylenebisacrylamide in 150 g of water was put in the test tube. Then 0.3 ml of a solution is which 1.568 g of ferrous ammonium sulfate (Mohr's salt) was dissolved in water of 10 ml, was poured into it as a redox catalyst. After the whole substrate was assured to be immersed in the solution, the atmosphere was replaced with nitrogen and the tube was sealed under reduced pressure. The test tube was placed in a thermostatic bath at 35° C. for 60 minutes, and acrylamide was graft polymerized on the lens substrate surface. The graft lens' is respectively expressed as A', B', C' and D'.

For each lens, the surface wettability and the oxygen permeability were evaluated. The wettability was evaluated with the contact angle measured by the sessile drop method, using water as solvent. The oxygen permeability was evaluated with Dk value (cc cm/cm² sec mmHg) by measuring the oxygen permeation coefficient in a physiological saline of 0.9 wt % at 35° C. using Model 2110 made by Zertex Corporation.

The results are shown in Table 27.

TABLE 27

| Sample name | Dk value /10$^{-11}$ | Contact angle/deg. |
|---|---|---|
| A | 0 | 80 |
| B | 53 | 85 |
| C | 82 | 88 |
| D | 150 | 92 |
| A' | 0 | 15 |
| B' | 52 | 18 |
| C' | 80 | 14 |
| D' | 151 | 15 |

As it is clear from Table 27, graft lens D' has high oxygen permeability and yet shows good surface wettability. While the oxygen permeability of the other graft lenses are relatively small, they show high wettability. This means that by graft polymerization of the hydrophilic polymer on the surface of the fluorine containing type contact lens substrate, an excellent contact lens having good surface wettability as well as high oxygen permeability is produced.

EXAMPLE 30

A contact lens substrate A made of a copolymer A which mainly contains methyl methacrylate (and does not contain silicon nor fluorine), a contact lens substrate B made of siloxanyl methacrylate type copolymer B (which does not contain fluorine), a contact lens substrate C made of fumarate type copolymer C and a contact lens substrate D made of fluorine containing type copolymer D (which is a copolymer of γ-methacryloxypropyl-tris(trimethylsiloxy)silane 48 wt %, 2,2,2-trifluoroethyl methacrylate 19 wt %, 1,3-bis(γ-methacryloxypropyl)-1,1,3,3-tetrakis (trimethylsiloxy) disiloxane 8 wt %, bis(trimethylsiloxy)-γ-methacryloxypropylsilanol 7 wt %, methacrylic acid 10 wt % methylamethacrylate 1 wt % ethyleneglycol dimethacrylate 7 wt %, 2,2'-azobis(2,4-isobutyronitrile) 0.25 wt %, only as a polymerization initiator, were respectively processed into a lens shape (having a diameter of about 8 mm and a thickness of bout 0.1 mm) by cutting and polishing process.

The lens substrate was installed in a space produce by spacers having a thickness of 1.5 mm, between electrodes of a corona discharge treatment apparatus in which the distance between electrodes was 3.5 cm, electric voltage between electrodes was 15 kV, and the frequency was 60 Hz, and discharge treatment was carried out. The discharge treatment was carried out on both surfaces of the lens substrate, one side by one side for 40 seconds on each side. The lens substrate after the discharge treatment was put in a test tube and 3.0 ml of a monomer aqueous solution prepared by dissolving 105 g of acrylamide and 15 g of N,N'-methylenebisacrylamide in 180 g of water was added to it. The amount of the monomer solution was enough for the lens substrate to be immersed in it. The test tube was connected to a vacuum system, and the air in the tube was aspirated, then sealing of the tube was carried out under vacuum condition. The test tube was inserted into water bath shaker (EP-1, produced by Taitec Corporation) and graft polymerization on the substrate surface was carried out by shaking it under thermostatic condition at 80° C. for a predetermined length of time. The graft lens is respectively expressed as A', B', C' and D'. After the polymerization was completed, the graft polymerization was checked if it was successful by the contact angle. The contact angle was measured by sessile droplet process using water as a solvent (Table 28). The presence of a scratch on the graft lens surface and the presence of crack in the edge pat was examined by optical microscope. The base curve of the lens before and after the graft polymerization was measured and the rate of change was calculated (Table 29). As for the shaking conditions of the water bath shaker (shaking cycle and amplitude), the shaking cycle employed was 160 cycle, and the shaking amplitude employed was 30 mm.

TABLE 28

| Polymerization time/min | A' Contact angle/deg | B' Contact angle/deg | C' Contact angle/deg | D' Contact angle/deg |
|---|---|---|---|---|
| 0 | 80 | 85 | 88 | 92 |
| 5 | 82 | 88 | 89 | 90 |
| 10 | 81 | 85 | 88 | 18 |
| 20 | 80 | 90 | 15 | 16 |
| 30 | 85 | 16 | 15 | 15 |
| 60 | 15 | 18 | 14 | 15 |

TABLE 29

| Polymerization time/min | A' surface | A' BC/% | B' surface | B' BC/% | C' surface | C' BC/% | D' surface | D' BC/% |
|---|---|---|---|---|---|---|---|---|
| 0 | ○ | 0 | ○ | 0 | ○ | 0 | ○ | 0 |
| 5 | ○ | 0 | ○ | 0 | ○ | 0 | ○ | 0 |
| 10 | ○ | 0 | ○ | 0 | ○ | 0 | ○ | 0 |
| 20 | ○ | 3 | ○ | 5 | X | 6 | X | 8 |
| 30 | ○ | 10 | ○ | 12 | X | 13 | X | 15 |
| 60 | ○ | 17 | X | 18 | X | 20 | X | 22 |

○: no scratch on surface, no crack in edge part
X: scratch exists on surface, crack exists in edge party From Table 28, it was found that only substrate D requires less than 20 minutes for graft polymerization. Table 16 shows when the polymerization times exceeds 20 minutes, a surface scratch, edge crack or base cure change occurs. Accordingly, the use of the fluorine containing type contact lens substrate is found to be very effective since the graft polymerization treatment can be carried out without causing a scratch, or lens form change.

EXAMPLE 31

A contact lens substrate A made of a copolymer A which mainly contain methyl methacrylate (and does not contain silicon nor fluorine), a contact lens substrate B made of siloxanyl methacrylate type copolymer B (which does not contain fluorine), a contact lens substrate C made of fumarate type copolymer C and a contact lens substrate D made of fluorine containing type copolymer D (which is a copolymer of γ-methacryloxypropyl-tris(trimethylsiloxy)silane 48 wt %, 2,2,2-trifluoroethyl methacrylate 19 wt %, 1,3-bis9γ-methacryloxypropyl)-1,1,3,3-tetrakis (trimethylsiloxy) disiloxane 8 wt %, bis(trimethylsiloxy)-γ-methacryloxypropylsilanol 7 wt %, methacrylic acid 10 wt %, methylmethacrylate 1 wt %, ethyleneglycol dimethacrylate 7 wt %, and 2,2'-azobis(2,4-isobutyronitrile) 0.25 wt %, only as a polymerization initiatory, were respectively processed into a lens shape (having a diameter of about 8 mm and a thickness of about 0.1 mm) by cutting and polishing process.

The lens substrate was installed in a discharging device (distance between electrodes of 600 mm, electric voltage between electrodes of 270 V, and frequency of 60 Hz), and glow discharge treatment was carried out in an argon atmosphere of 0.04 Torr for 5 seconds, and the lens substrate was exposed to air for a while then put in a test tube.

2.7 ml of a monomer aqueous solution prepared by dissolving 105 g of acrylamide and 15 g of N,N'-methylenebisacrylamide in 150 g of water was put in the test tube. Then 0.3 ml of a solution in which 0.158 g of ferrous ammonium sulfate (Mohr's salt) was dissolved in water of 10 ml, was poured into it as a redox catalyst. After the whole substrate was assured to be immersed in the solution, the atmosphere was replaced with nitrogen and the tube was sealed under reduced pressure. The test tube was placed in a thermostatic bath at 35° C. for 60 minutes, and acrylamide was graft polymerized on the lens substrate surface. The graft lens is respectively expressed as A', B', C' and D'.

Subsequently, the rubbing resistance of each material was examined.

First of all, the lens was washed by rubbing with hands smeared with a detergent 200 times (forward and backward). Then, the contact angle of the lens surface after the rubbing was measured, and the difference between it and the contact angle measure and recorded before the rubbing was used to evaluate the degree of the graft polymer's removal.

For comparison, products obtained by graft treatment using a 40 wt % acrylamide aqueous solution system in which no cross-linking agent was added, were treated with the same procedure use for the sample A'–D' in Table 30.

The measurement of the contact angle was carried out by sessile drop method, and water was used as a solvent. The results are shown in Table 30.

TABLE 30

| Sample | Contact angle θ before rubbing | Contact angle θ after rubbing | Contact angle change |
|---|---|---|---|
| A' | 16 | 16 | 0 |
| B' | 14 | 15 | 1 |
| C' | 15 | 15 | 0 |
| D' | 20 | 20 | 0 |
| Comparative Example | | | |
| A' | 17 | 37 | 20 |
| B' | 14 | 45 | 31 |
| C' | 16 | 75 | 59 |
| D' | 18 | 96 | 78 |

*Contact angle θ/deg
Sample: obtained by a cross-linking agent monomer solution.

Comparative Example: obtained by a cross-linking agent non-added monomer solution (i.e., by acrylamide 40 wt % aqueous solution).

Table 30 shows that in all of the graft lenses of the comparative examples, where the cross-linking agent was not added, the wettability was degradated by rubbing. Especially with D', which is the graft treated product of a fluorine containing lens, the change of the contact angle before and after the rubbing was very big, and that shows that the bonding strength between the graft layer and the lens substrate was weak. However, when the cross-linking agent was added (Sample A'-D' in Table 30), the contact angle scarcely changes, and there is no difference of the bonding strength of the graft layer with the substrate observed between different substrates. Accordingly, the addition of the cross-linking agent has a much bigger effect in improving the bonding strength on the substrate D' than on the other materials A', B' and C'. That is, the use of the fluorine containing type contact lens as a substrate to be grafted, has an advantage that the effect of the rubbing resistance of the graft polymer can be increased.

As described above, the present invention will provide a contact lens having good wearability and a very effective method of its production.

Industrial Applicability

The embodiments of the present invention were explained using a fluoroalkyl containing contact lens substrate and a contact lens substrate made of a copolymer of an alkyl fumarate, a siloxanyl fumarate, a fluoroalkyl fumarate and methyl methacrylate; however, the substrates are not limited as these and have obtained similar results with other hard contact lenses with different compositions as well as other soft contact lenses such as silicon rubber.

In addition to that, similar results were also obtained regarding the surface treatment of various polymer materials including polyethylene film, polypropylene, polyvinyl chloride, polyvinylidene chloride, acetate, polyester, polyvinyl alcohol, polystyrene and polycarbonate.

In the embodiments of the present invention, acrylamide, N,N'-methylenebisacrylamide and acrylic acid were used as illustrative hydrophilic monomers, however, similar results were also obtained by the use of other hydrophilic monomers such as 2-hydroxyethyl methacrylate, polyvinyl alcohol, N-vinylpyrolidone, polyethylene oxide, and other di-functional monomers such as glycerine diacrylate, trimethylol propane triacrylate (acrylate type), ethylene glycol dimethacrylate, diethylene glycol dimethacrylate, triethylene glycol dimethacrylate, 1,3-butadiol dimethacrylate (methacrylate type) and N-substituted acrylamide monomer such as N-ethyl acrylamide, N-methyl acrylamide, N-cyclopropyl arylamide (alkyl acrylamide), N,N-dimethyl acrylamide, N-methyl-N-ethyl acrylamide (dialkyl acrylamide).

As for the graft polymer in which polyacrylic acid is entangled to make a network structure, since the graft polymer has thermosensitive characteristics, it can be applied for such a use as control of an enzyme reaction by desorption/adsorption of the enzyme, recovery of the enzyme, and a sensor for a micromachine. Furthermore, it can be also applied for various wrapping materials, a water retaining material for agricultural use, or a medical product such as an artificial organ.

We claim:

1. A contact lens comprising a contact lens substrate and hydrophilic monomers graft polymerized on a surface of the contact lens substrate, wherein graft polymer chains on the surface of the contact lens substrate are cross-linked and the density of cross-linkages of the graft polymer chains on the surface of the contact lens substrate is uniform, said contact lens being formed by the steps of (a) carrying out a discharging treatment on a surface of a contact lens substrate produced from at least one compound selected from the group consisting of an acrylic ester, a methacrylic ester, a fluorinated cyclic olefin, a copolymer of an acrylic ester, a copolymer of a methacrylic ester and a fumaric ester, and mixtures thereof, (b) immersing the contact lens substrate in a hydrophilic monomer solution containing a cross-linking agent in a concentration ranging from 2% to 10% by weight of said hydrophilic monomer solution, and (c) graft polymerizing the hydrophilic monomers on the contact lens substrate surface while shaking or applying ultrasonic waves having a power output of at least 10 watts and a duration of at least 10 seconds to the hydrophilic monomer solution, so that the density of cross-linkages of graft polymer chains on the surface of the contact lens is uniform.

2. The contact lens of claim 1, wherein said substrate is produced from at least one compound selected from the group consisting of an acrylic ester, a methacrylic ester, a fluorine containing cyclic olefin and mixtures thereof.

3. The contact lens of claim 2, wherein said substrate is produced from a polymer selected from the group consisting of an acrylic ester copolymer and a copolymer of methacrylic ester and a fumaric ester.

4. The contact lens of claim 2, wherein said compound is an acryloxyalkyl polysiloxane or methacryloxyalkyl polysiloxane having the following general formula:

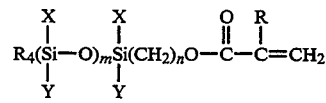

wherein R=CH₃ or H; X=a $C_1$-$C_6$ alkyl, cyclohexyl, phenyl or $Z_1$; Y=a $C_1$-$C_6$ alkyl, cyclohexyl, phenyl or $Z_1$;

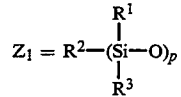

$R^1$=a $C_1$-$C_6$ alkyl, cyclohexyl or phenyl; $R^2$=a $C_1$-$C_6$ alkyl, cyclohexyl or phenyl; $R^3$=a $C_1$-$C_6$ alkyl, cyclohexyl or phenyl; $R_4$=a $C_1$-$C_6$ alkyl, cyclohexyl or phenyl; m=1-3, n=1-5, p=1-3.

5. The contact lens of claim 2, wherein the compound has the following general formula:

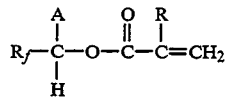

wherein, R=CH₃ or H; A=H, cyclohexyl, phenyl or $R_f$; $R_f$=a polyfluoroalkyl or pentafluorophenyl.

6. The contact lens of claim 5, wherein $R_f$ has less than or equal to 20 fluorine atoms.

7. The contact lens of claim 2, wherein said compound has the following general formula:

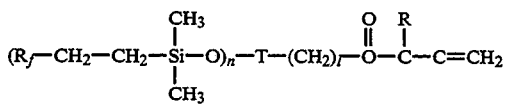

wherein R=CH$_3$ or H; R$_f$=a C$_1$-C$_4$ fluoroalkyl, l=1-4; T=SiH$_2$, Si(CH$_3$)$_2$ or SiHCH$_3$; and n=1-3.

8. The contact lens of claim 2, wherein said compound has the following general formula:

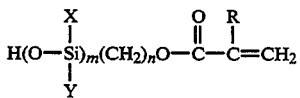

wherein R=CH$_3$ or H; X, Y=a C$_1$-C$_6$ alkyl, phenyl or Z$_1$;

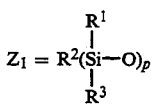

m=1-3; n=1-5; p=1-3; R$^1$=a C$_1$-C$_6$ alkyl, cyclohexyl or phenyl; R$^2$=a C$_1$-C$_6$ alkyl, cyclohexyl or phenyl; R$^3$=a C$_1$-C$_6$ alkyl, cyclohexyl or phenyl.

9. The contact lens of claim 2, wherein the polymer has the following general formula:

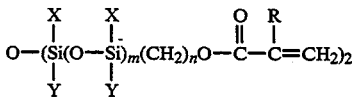

wherein R=CH$_3$ or H; m=0-3; n=1-5, X=a C$_1$-C$_6$ alkyl, cyclohexyl, phenyl or Z$_1$; Y=a C$_1$-C$_6$ alkyl, cyclohexyl, phenyl or Z$_1$;

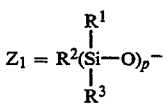

p=1-3; R$^1$=a C$_1$-C$_6$ alkyl, cyclohexyl or phenyl, R$^2$=a C$_1$-C$_6$ alkyl, cyclohexyl or phenyl; R$^3$=a C$_1$-C$_6$ alkyl, cyclohexyl or phenyl.

10. The contact lens of claim 2, wherein said compound has the following general formula:

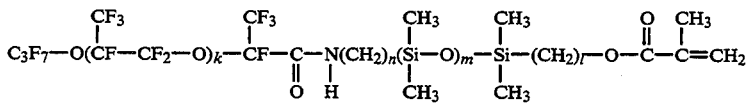

wherein l=1-3; m=1-10; n=1-3, k=1-3.

11. The contact lens of claim 2, wherein said compound has the following general formula:

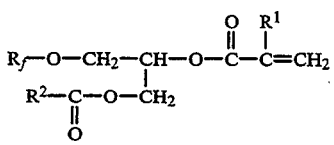

wherein R$_f$=a C$_1$-C$_{30}$ fluoroalkyl comprising at least three fluorine atoms, wherein R$^1$=CH$_3$ or H; R$^2$=a C$_1$-C$_{30}$ alkyl, which optionally comprises at least one fluorine atom or at least one oxygen atom.

12. The contact lens of claim 11, wherein the fluoroalkyl further comprises at least one oxygen atom.

13. The contact lens of claim 2, wherein said compound has the following general formula:

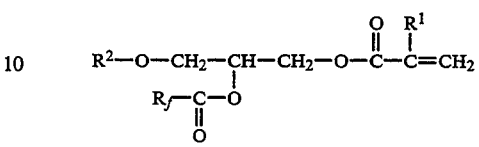

wherein R$_f$=C$_1$-C$_{30}$ fluoroalkyl comprising at least three fluorine atoms, R$^1$=CH$_3$ or H; and R$^2$=C$_1$-C$_{30}$ alkyl.

14. The contact lens of claim 13, wherein the fluoroalkyl further comprises at least one oxygen atom.

15. The contact lens of claim 13, wherein the alkyl comprises at least one fluorine atom.

16. The contact lens of claim 13, wherein the alkyl comprises at least one oxygen atom.

17. The contact lens of claim 2, wherein said compound has the following general formula:

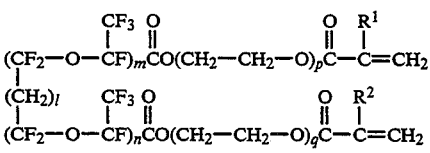

wherein R$^1$ and R$^2$=CH$_3$ or H; l=2-4; p and q=1 or 2; m and n are integral numbers and m+n is within the range of 1-20.

18. The contact lens of claim 2, wherein said compound has the following general formula:

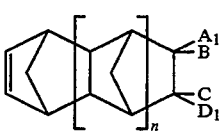

wherein A$_1$=H, F or an alkyl; B=H, F or an alkyl; C=H, F or an alkyl; and D$_1$=F or a C$_1$-C$_{30}$ fluoroalkyl comprising at least one fluorine atom; and n=0, 1 or 2.

19. The contact lens of claim 18, wherein the fluoroalkyl further comprises at least one oxygen atom.

20. The contact lens of claim 2, wherein said compound has the following general formula:

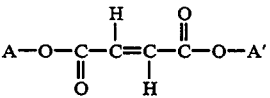

wherein A and A' are selected from the group consisting of a C$_1$-C$_5$ alkyl and D, and D is a group having the following general formula:

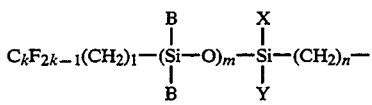

wherein X and Y are selected from the group consisting of a $C_1$-$C_5$ alkyl and $Z_2$, and $Z_2$ is a group having the following general formula:

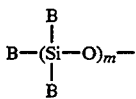

wherein B is a $C_1$-$C_5$ alkyl; k, l, m and n are 0 or positive integers.

21. The contact lens of claim 1, wherein the hydrophilic monomer is at least one compound selected from the group consisting of acrylamide, 2-hydroxyethyl methacrylate, polyvinyl alcohol, N-vinylpyrolidone, polyethylene oxide, dimethyl acrylamide, and N,N'-methylenebisacrylamide.

22. The contact lens of claim 1, wherein the cross linkage between the graft polymer chains is formed by a cross-linking agent.

23. The contact lens of claim 1, wherein the graft polymer chains are bonded by hydrogen bonding.

24. The contact lens of claim 22, wherein the cross-linking agent comprises at least one compound selected from the group consisting of N,N'-methylenebisacrylamide, glycerine diacrylate, trimethylol propane triacrylate, ethylene glycol dimethacrylate, diethylene glycol dimethacrylate, and 1,3-butanediol dimethacrylate.

25. The contact lens of claim 1, wherein the lens exhibits an average change in water contact angle of 15 degrees or less, as measured by the sessile drop method, when the lens is exposed to a detergent and rubbed 1000 times.

26. The contact lens of claim 22, wherein the lens exhibits an average change in water contact angle of 5 degrees or less, as measured by the sessile drop method, when the lens is exposed to a detergent and rubbed 1000 times.

27. The contact lens of claim 2, wherein the lens exhibits an average change in water contact angle of 15 degrees or less, as measured by the sessile drop method, when the lens is exposed to a detergent and rubbed 1000 times.

28. The contact lens of claim 1, wherein the graft polymer chains are present in an amount of from 5–15 $\mu g/cm^2$.

29. A method of producing a contact lens, comprising:
carrying out a discharging treatment on a surface of a contact lens substrate produced from at least one compound selected from the group consisting of an acrylic ester, a methacrylic ester, a fluorinated cyclic olefin, a copolymer of an acrylic ester, a copolymer of a methacrylic ester and a fumaric ester, and mixtures thereof;
immersing the contact lens substrate in a hydrophilic monomer solution containing a cross-linking agent in a concentration ranging from 2% to 10% by weight of said hydrophilic monomer solution; and
graft polymerizing the hydrophilic monomers on the contact lens substrate surface while applying ultrasonic waves having a power output of at least 10 watts and a duration of at least 10 seconds to the contact lens substrate in the hydrophilic monomer solution under vacuum.

30. The method of claim 29, wherein said compound is a methacryloxyalkyl polysiloxane or acryloxyalkyl polysiloxane expressed as the following general formula:

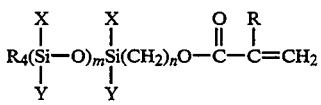

wherein $R=CH_3$ or H; X=a $C_1$-$C_6$ alkyl, cyclohexyl, phenyl or $Z_1$; Y=a $C_1$-$C_6$ alkyl, cyclohexyl, phenyl or $Z_1$;

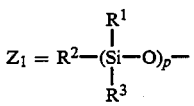

$R^1$=a $C_1$-$C_6$ alkyl, cyclohexyl or phenyl, $R^2$=a $C_1$-$C_6$ alkyl, cyclohexyl or phenyl; $R^3$=a $C_1$-$C_6$ alkyl, cyclohexyl or phenyl; $R_4$=a $C_1$-$C_6$ alkyl, cyclohexyl or phenyl; m=1–3, n=1–5, p=1–3.

31. The method of claim 29, wherein said compound is a fluoroalkyl methacrylate or a fluoroalkyl acrylate having up to 20 fluorine atoms expressed as the following general formula:

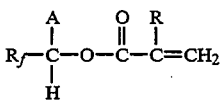

wherein, $R=CH_3$ or H; A=H, cyclohexyl, phenyl or $R_f$; $R_f$=a polyfluoroalkyl or pentafluorophenyl.

32. The method of claim 24, wherein the compound is a methacryloxyalkyl polyfluoroalkyl siloxane or acryloxyalkyl polyfluoroalkyl siloxane expressed as the following general formula:

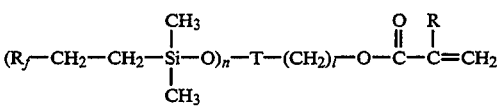

wherein $R=CH_3$ or H; $R_f$=a $C_1$-$C_4$ fluoroalkyl, l=1–4; T=$SiH_2$, $Si(CH_3)_2$ or $SiHCH_3$; and n=1–3.

33. The method of claim 29, wherein the compound is a methacryloxyalkyl silanol or acryloxyalkyl silanol expressed as the following general formula:

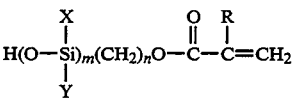

wherein $R=CH_3$ or H; X, Y=a $C_1$-$C_6$ alkyl, phenyl or $Z_1$;

$$Z_1 = R^2(\overset{R^1}{\underset{R^3}{Si}}-O)_p-$$

m=1-3; n=1-5; p=1-3; $R^1$=a $C_1$-$C_6$ alkyl, cyclohexyl or phenyl, $R^2$=a $C_1$-$C_6$ alkyl, cyclohexyl or phenyl; $R^3$=a $C_1$-$C_6$ alkyl, cyclohexyl or phenyl.

34. The method of claim 29, wherein the compound is a polymethacryloxyalkyl polysiloxane or a polyacryloxyalkyl polysiloxane expressed as the following general formula:

$$O-(\overset{X}{\underset{Y}{Si}}(O-\overset{X}{\underset{Y}{Si}})_m(CH_2)_nO-\overset{O}{\overset{\|}{C}}-\overset{R}{\underset{}{C}}=CH_2)_2$$

wherein R=$CH_3$ or H; m=0-3; n=1-5, X=a $C_1$-$C_6$ alkyl, cyclohexyl, phenyl or $Z_1$; Y=a $C_1$-$C_6$ alkyl, cyclohexyl, phenyl or $Z_1$;

$$Z_1 = R^2(\overset{R^1}{\underset{R^3}{Si}}-O)_p-$$

p=1-3; $R^1$=a $C_1$-$C_6$ alkyl, cyclohexyl or phenyl, $R^2$=a $C_1$-$C_6$ alkyl, cyclohexyl or phenyl; $R^3$=a $C_1$-$C_6$ alkyl, cyclohexyl or phenyl.

35. The method of claim 29, wherein the compound is a fluorine containing siloxanyl methacrylate expressed as the following general formula:

$$C_3F_7-O(\overset{CF_3}{\underset{}{CF}}-CF_2-O)_k-\overset{CF_3}{\underset{}{CF}}-\overset{}{\underset{O}{C}}-N(CH_2)_n(\overset{CH_3}{\underset{CH_3}{Si}}-O)_m-\overset{CH_3}{\underset{CH_3}{Si}}(CH_2)_l-O-\overset{O}{\overset{\|}{C}}-\overset{CH_3}{\underset{}{C}}=CH_2$$

wherein l=1-3; m=1-10; n=1-3, k=1-3.

36. The method of claim 29, wherein the compound is a fluorine containing acrylic or methacrylic ester monomer expressed as the following general formula:

$$R_f-O-CH_2-\overset{}{\underset{R^2-\overset{}{\underset{O}{C}}-O-CH_2}{CH}}-O-\overset{O}{\overset{\|}{C}}-\overset{R^1}{\underset{}{C}}=CH_2$$

wherein $R_f$=a $C_1$-$C_{30}$ fluoroalkyl containing at least three fluorine atoms, $R^1$=$CH_3$ or H; and $R^2$=a $C_1$-$C_{30}$ alkyl.

37. The method of claim 36, wherein the fluoroalkyl comprises at least one oxygen atom.

38. The method of claim 36, wherein the alkyl comprises at least one fluorine atom.

39. The method of claim 36, wherein the alkyl comprises at least one oxygen atom.

40. The method of claim 29, wherein the compound is a fluorine containing acrylic or methacrylic ester type monomer expressed as the following general formula:

$$R^2-O-CH_2-\overset{}{\underset{R_f-\overset{}{\underset{O}{C}}-O}{CH}}-CH_2-O-\overset{O}{\overset{\|}{C}}-\overset{R^1}{\underset{}{C}}=CH_2$$

wherein $R_f$=a $C_1$-$C_{30}$ fluoroalkyl comprising at least three fluorine atoms, $R^1$=$CH_3$ or H; and $C_1$-$C_{30}$ alkyl.

41. The method of claim 40, wherein the fluoroalkyl further comprises at least one oxygen atom.

42. The method of claim 40, wherein the alkyl comprises at least one fluorine atom.

43. The method of claim 40, wherein the alkyl comprises at least one oxygen atom.

44. The method of claim 29, wherein the compound is a fluorine containing diacrylate or dimethacrylate monomer expressed as the following general formula:

$$(CF_2-O-\overset{CF_3}{\underset{}{CF}})_m\overset{O}{\overset{\|}{C}}O(CH_2-CH_2-O)_p\overset{O}{\overset{\|}{C}}-\overset{R^1}{\underset{}{C}}=CH_2$$

$$\overset{(CH_2)_l}{\underset{}{|}}$$

$$(CF_2-O-\overset{CF_3}{\underset{}{CF}})_n\overset{O}{\overset{\|}{C}}O(CH_2-CH_2-O)_q\overset{O}{\overset{\|}{C}}-\overset{R^2}{\underset{}{C}}=CH_2$$

wherein $R^1$ and $R^2$=$CH_3$ or H; l=2-4; p and q=1 or 2; m and n are integers within the range of 1-20.

45. The method of claim 29, wherein the compound is a fluorine containing cyclic olefin expressed as the following general formula:

wherein, $A_1$=H, F or an alkyl; B=H, F or an alkyl; C=H, F or an alkyl; and $D_1$=F or a $C_1$-$C_{30}$ fluoroalkyl comprising at least one fluorine atom; and n=0, 1 or 2.

46. The method of claim 45, wherein the fluoroalkyl further comprises at least one oxygen atom.

47. The method of claim 29, wherein the compound is an alkyl fumarate, a fluoroalkyl fumarate, or a siloxanyl fumarate expressed as the following general formula:

$$A-O-\overset{H}{\underset{\overset{\|}{\underset{O}{C}}}{C}}=\overset{O}{\underset{H}{\overset{\|}{C}}}-\overset{}{\underset{}{C}}-O-A'$$

wherein A and A' are selected from a group consisting of a $C_1$-$C_5$ alkyl and D, and D is a group having the following general formula:

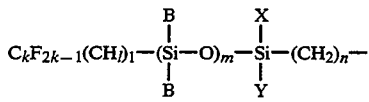

wherein X and Y are selected from a group consisting of a $C_1$–$C_5$ alkyl and $Z_2$, and $Z_2$ is a group having the following general formula:

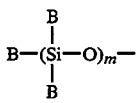

wherein B is a $C_1$–$C_5$ alkyl; k, l, m, and n are 0 or positive integers.

48. The method of claim 29, wherein the graft polymerization is carried out under ambient or lower pressure.

49. The method of claim 29, wherein the hydrophilic monomer comprises acrylamide, N,N'-methylenebisacrylamide or a mixture thereof.

50. The method of claim 29, wherein a reducing substance diammonium cerium (IV) nitrate is added.

51. The method of claim 29, wherein the graft polymerization is initiated by heating.

52. The method of claim 29, wherein the hydrophilic monomer is at least one compound selected from the group consisting of acrylamide, 1-hydroxyethyl methacrylate, polyvinyl alcohol, N-vinylpyrolidone, polyethylene oxide, dimethyl acrylamide, and N,N'-methylenebisacrylamide.

53. The method of claim 49, wherein the N,N'-methylenebisacrylamide is used in an amount of from 2% to 10% by weight.

54. The method of claim 29, wherein polymerization is carried out after the contact lens substrate is installed in a protection jig, which is placed in a polymerization vessel.

55. The method of claim 54, wherein surface hardness of the protection jig is smaller than a surface hardness of the substrate.

56. A method of producing a contact lens, comprising:
carrying out a discharging treatment on a surface of a contact lens substrate produced from at least one compound selected from the group consisting of an acrylic ester, a methacrylic ester, a fluorinated cyclic olefin, a copolymer of an acrylic ester, a copolymer of a methacrylic ester and a fumaric ester, and mixtures thereof;
immersing the contact lens substrate in a hydrophilic monomer solution containing a cross-linking agent in a concentration ranging from 2% to 10% by weight of said hydrophilic monomer solution; and
graft polymerizing the hydrophilic monomers on the contact lens substrate surface while sufficiently shaking the hydrophilic monomer solution under vacuum to ensure that the density of cross-linkages of graft polymer chains on the surface of the contact lens is uniform.

57. The method of claim 29, wherein reducing substance ferrous ammonium sulfate is added.

58. The method of claim 29, wherein said duration is from 10 seconds to 10 minutes.

59. The method of claim 29, wherein the discharging treatment is carried out under normal or reduced pressure; the monomer solution mainly contains acrylamide and N,N'-methylenebisacrylamide; said reducing substance is diammonium cerium (IV) nitrate in an amount of from 0.01 g to 1 g per 1 g of monomers; and the graft polymerization is carried out under normal pressure.

60. The method of claim 29, wherein the discharging treatment is carried out under normal or reduced pressure; the monomer solution mainly contains acrylamide and N,N'-methylenebisacrylamide; said reducing substance is ferrous ammonium sulfate in an amount of from 0.02 g to 0.06 g per 1 g of monomers.

61. The method of claim 29, wherein the cross-linking agent is selected from the group consisting of N,N'-methylenebisacrylamide, glycerine diacrylate, trimethylol propane triacrylate, ethylene glycol dimethacrylate, diethylene glycol dimethacrylate and 1,3-butanediol dimethacrylate.

62. The method of claim 29, wherein polymerization is carried out with a reducing agent.

63. The method of claim 29, wherein the concentration of said cross-linking agent is 5–10% by weight of said hydrophilic monomer solution.

64. The method of claim 29, wherein said hydrophilic monomer solution contains hydrophilic monomers in a concentration of 37–45% by weight of said hydrophilic monomer solution.

65. The method of claim 64, wherein said hydrophilic monomer solution contains hydrophilic monomers in a concentration of 40–45% by weight of said hydrophilic monomer solution.

66. A method of producing a contact lens, comprising:
carrying out a discharging treatment on a surface of a contact lens substrate produced from at least one compound selected from the group consisting of an acrylic ester, a methacrylic ester, a fluorinated cyclic olefin, a copolymer of an acrylic ester, a copolymer of a methacrylic ester and a fumaric ester, and mixtures thereof;
immersing the contact lens substrate in a hydrophilic monomer solution, and applying ultrasonic waves having a power output of at least 10 watts and a duration of at least 10 seconds to the lens substrate in the hydrophilic monomer solution under vacuum;
adding a reducing substance; and
graft polymerizing the hydrophilic monomers on the contact lens substrate surface while applying said ultrasonic waves to the contact lens substrate in the hydrophilic monomer solution under vacuum.

67. The method of claim 66, wherein the hydrophilic monomer comprises acrylamide, N,N'-methylenebisacrylamide or a mixture thereof.

68. The method of claim 66, wherein the reducing substance is diammonium cerium (IV) nitrate.

69. The method of claim 66, wherein the graft polymerization is initiated by heating.

70. The method of claim 66, wherein the reducing substance is ferrous ammonium sulfate.

71. The method of claim 66, wherein said duration is from 10 seconds to 10 minutes.

72. The method of claim 66, wherein the discharging treatment is carried out under normal or reduced pressure; the monomer solution mainly contains acrylamide and N,N'-methylenebisacrylamide; said reducing substance is diammonium cerium (IV) nitrate in an amount of from 0.01 g to 1 g per 1 g of monomers; and the graft polymerization is carried out under normal pressure.

73. The method of claim 59, wherein the discharging treatment is carried out under normal or reduced pressure; the monomer solution mainly contains acrylamide and N,N'-methylenebisacrylamide; said reducing substance is ferrous ammonium sulfate in an amount of from 0.02 g to 0.06 g per 1 g of monomers.

* * * * *

UNITED STATES PATENT AND TRADEMARK OFFICE
CERTIFICATE OF CORRECTION

PATENT NO. : 5,391,589
DATED : February 21, 1995
INVENTOR(S) : Hiroshi KIGUCHI et al.

It is certified that error appears in the above-indentified patent and that said Letters Patent is hereby corrected as shown below:

On the cover page, please add the following:

--Related U.S. Application Data

[63] Continuation-in-Part of PCT/JP92/01203, September 21, 1992, and PCT/JP92/01204, September 21, 1992--.

Signed and Sealed this

First Day of August, 1995

*Attest:*

BRUCE LEHMAN

*Attesting Officer*   *Commissioner of Patents and Trademarks*